(12) United States Patent
Buono

(10) Patent No.: US 6,239,585 B1
(45) Date of Patent: *May 29, 2001

(54) SELF-OSCILLATING SWITCH-MODE DC TO DC CONVERSION WITH CURRENT SWITCHING THRESHOLD HYSTERESIS

(76) Inventor: Robert N. Buono, 31 Upper Lakeview Ave., Ringwood, NJ (US) 07456

( * ) Notice: Subject to any disclaimer, the term of this patent is extended or adjusted under 35 U.S.C. 154(b) by 0 days.

This patent is subject to a terminal disclaimer.

(21) Appl. No.: 09/390,814

(22) Filed: Sep. 7, 1999

Related U.S. Application Data

(63) Continuation-in-part of application No. 08/986,978, filed on Dec. 8, 1997, now Pat. No. 5,949,222.

(51) Int. Cl.⁷ .................................................. G05F 1/56
(52) U.S. Cl. .......................................... 323/282; 323/284
(58) Field of Search ................................. 323/222, 282, 323/284, 299

(56) References Cited

U.S. PATENT DOCUMENTS

| | | | |
|---|---|---|---|
| 3,435,320 | * 3/1969 | Lee et al. | |
| 4,008,429 | * 2/1977 | Phalan | 323/284 |
| 4,242,629 | * 12/1980 | Shvey | 323/282 |
| 4,456,872 | * 6/1984 | Froeschle | 323/286 |
| 4,862,013 | * 8/1989 | Konopka | 323/284 |
| 4,961,006 | * 10/1990 | Pace et al. | 323/222 |
| 5,341,085 | * 8/1994 | Ettes | 323/222 |
| 5,389,871 | * 2/1995 | Otake | 323/282 |
| 5,825,163 | * 10/1998 | Pontarollo | 323/222 |
| 5,949,222 | * 9/1999 | Buono | 323/222 |

* cited by examiner

Primary Examiner—Jeffrey Sterrett
(74) Attorney, Agent, or Firm—Priest & Goldstein, PLLC

(57) ABSTRACT

A simple, self-oscillating, DC-to-DC converter current source, using a small number of simple components, with hysteresis around the current switching thresholds. Slight design modifications allow operation in any of several topologies. In another aspect of the invention, operation as a regulated DC-to-DC converter voltage source is achieved through the addition of a small number of additional components, with slight design modifications allowing operation in any of several topologies.

14 Claims, 10 Drawing Sheets

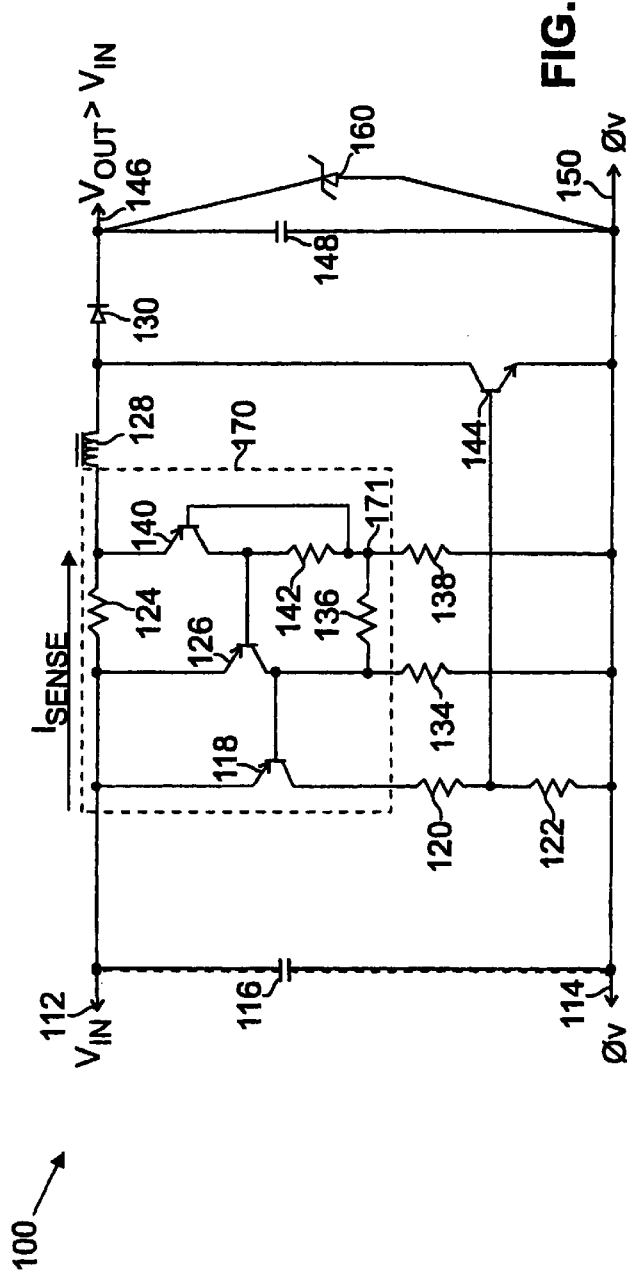
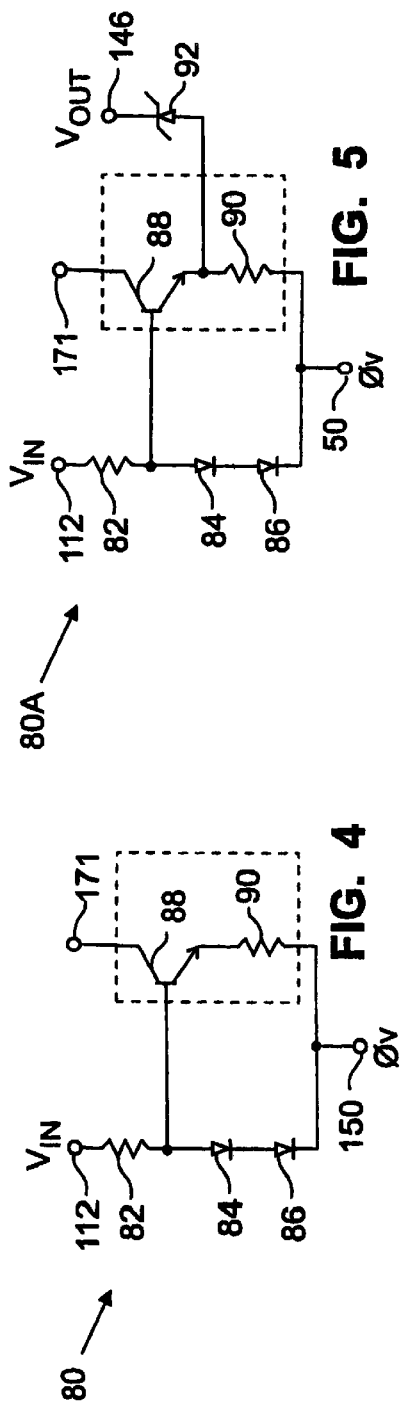

$V_{ce}$ 118 (DRIVER)

$V_{ce}$ 144 (POWER SWITCH)

$V_{ce}$ 126

$V_{ce}$ 140

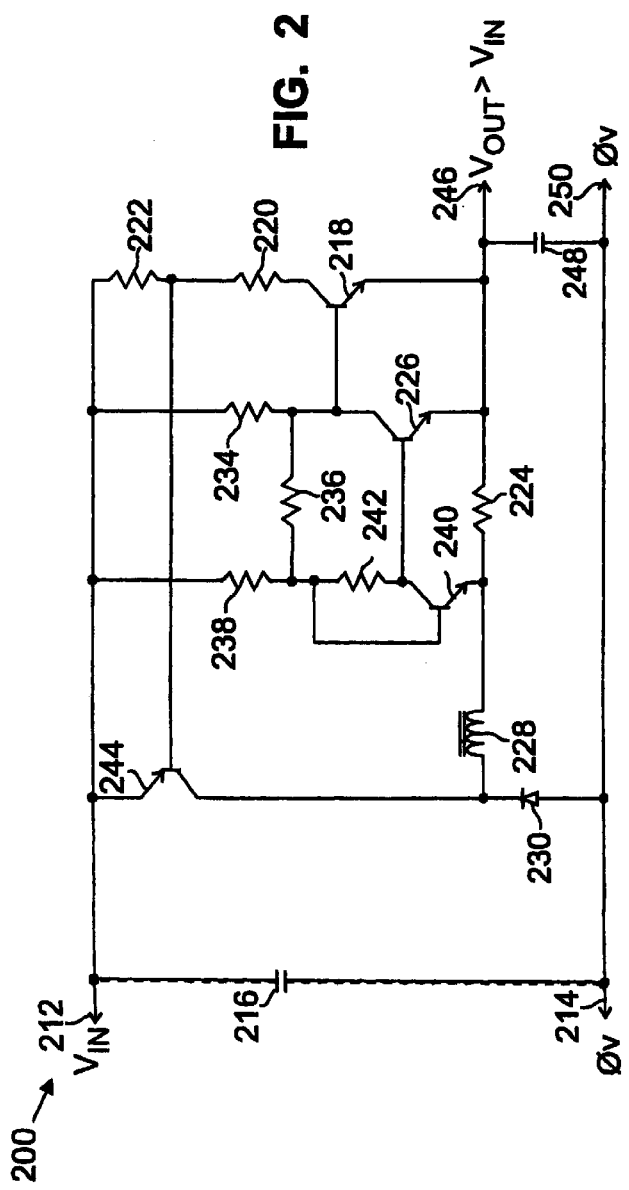
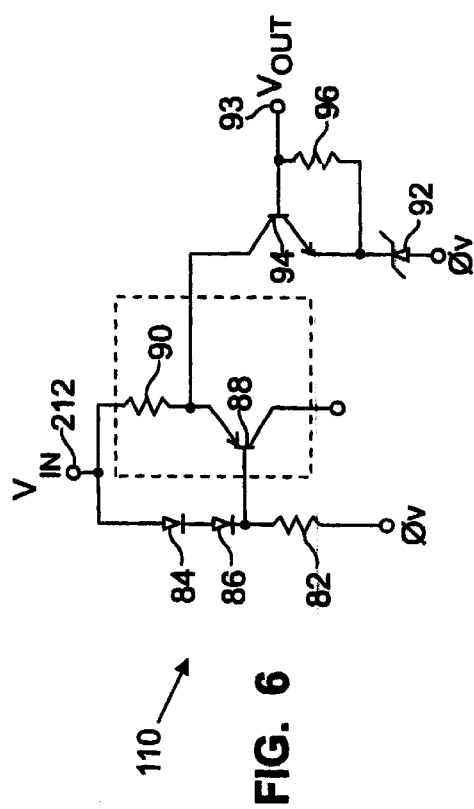
FIG. 2
FIG. 6

SELF-OSCILLATING SWITCH-MODE DC TO DC CONVERSION WITH CURRENT SWITCHING THRESHOLD HYSTERESIS

RELATED APPLICATIONS

The present application is a continuation-in-part of U.S. Ser. No. 08/986,978 filed on Dec. 8, 1997 now U.S. Pat. No. 5,949,222, by the same inventor as the present application.

FIELD OF THE INVENTION

The present invention relates generally to power supplies for electric and electronic circuits. More particularly, the invention relates to a self-oscillating, switch-mode, DC to DC converter for implementation of hysteretic current-mode control.

BACKGROUND OF THE INVENTION

As disclosed in Froeschle U.S. Pat. No. 4,456,872, hysteretic current-mode control offers significant advantages for many applications. Hysteretic current-mode control offers the tightest and most accurate control of inductor current, is unconditionally stable regardless of duty cycle, and offers excellent transient response to step loads. It is also inherently load-current limiting. Other advantages include short-circuit-proof operation in buck-derived topologies, easy loop-stability design, absence of subharmonic oscillation, instantaneous peak-to-average inductor-current ratio, and the absence of a need for slope compensation for duty cycles above 50%.

Although hysteretic current-mode control offers many advantages, it has not yet achieved the widespread use which might be anticipated given the advantages it offers. This may be due to the fact that most hysteretic current-mode control circuits of the present state of the art are complex, requiring numerous components, with an accompanying significant cost disadvantage with respect to simpler, non-hysteretic arrangements. A hysteretic current-mode control circuit requiring fewer and simpler components would naturally be less expensive to design and manufacture, and would make the advantages of this mode of control available in more applications.

The present invention recognizes the need for a circuit for achieving hysteretic current-mode control which can be manufactured using a small number of simple components to form a low cost unit suitable for use in applications such as a low cost battery charger, a regulated voltage source in a battery operated electronic device or any other application requiring a low cost DC-to-DC converter, as more fully described below.

SUMMARY OF THE INVENTION

A DC-to-DC converter circuit according to one aspect of the present invention includes only 4 transistors or switches and operates so as to utilize hysteresis around the current switching thresholds. Such a circuit may be readily implemented in a very low cost integrated circuit ("IC"). A circuit according to one aspect of the present invention operates as a current source in a BOOST topology, with the output voltage, $V_{out}$, greater than, the input voltage, $V_{in}$ with $V_{out}$ and $V_{in}$ having the same polarity. In another aspect, the present invention operates as a current source in a BUCK topology, with $V_{out}$ less than $V_{in}$, with $V_{out}$ and $V_{in}$ having the same polarity. A circuit according to a further aspect of the present invention operates as a current source in an INVERTING topology, with $V_{out}$ opposite in polarity to $V_{in}$, and of any absolute value relative to $V_{in}$. A circuit according to another aspect of the present invention includes additional components and can be operated as a regulated voltage source in any of the aforementioned topologies with or without negative feedback.

Among the advantages of switch mode-designs such as those of the present invention are that they are inherently more efficient than linear-mode designs because the main power switching component is either in one of two states, fully ON (saturated) or fully OFF. In an ideal sense, both of these two states dissipate no power. In other words, the power switch can experience high voltage or high current, but never both simultaneously. Therefore, the potential for high operating efficiency exists. In real-world practically realizable devices, neither of these two states is perfectly achieved, so there is still some power loss. There is also power lost during the actual switching transition time from one state to the other. However, these losses are much less than those in a linear design. A linear design is one in which the ON-state of the power transistor is continuously variable from fully ON to fully OFF. In this mode of operation, it is possible to simultaneously have high levels of current and voltage on the power transistor, and therefore high power dissipation, and low power conversion efficiency.

A more complete understanding of the present invention, as well as further features and advantages of the invention, will be apparent from the following Detailed Description and the accompanying drawings.

BRIEF DESCRIPTION OF THE DRAWINGS

FIG. 1A is a schematic diagram illustrating a DC-to-DC converter current source according to the present invention, configured in a BOOST topology;

FIG. 2 is a schematic diagram illustrating a DC-to-DC converter current source according to the present invention, configured in a BUCK topology;

FIG. 4 is a schematic diagram illustrating a current source which, when used in a BOOST topology DC-to-DC converter, achieves current regulation of the converter and sets the maximum power of the converter;

FIG. 5 is a schematic diagram illustrating a current source which, when used in a BOOST topology DC-to-DC converter, achieves output voltage regulation of the converter and sets the maximum power of the converter, as well as, allowing a lower output current than set by the current source illustrated in FIG. 4;

FIG. 6 is a schematic diagram illustrating a current source which, when used in a BUCK topology DC-to-DC converter, achieves voltage regulation of the converter;

DETAILED DESCRIPTION

Figure 1B:
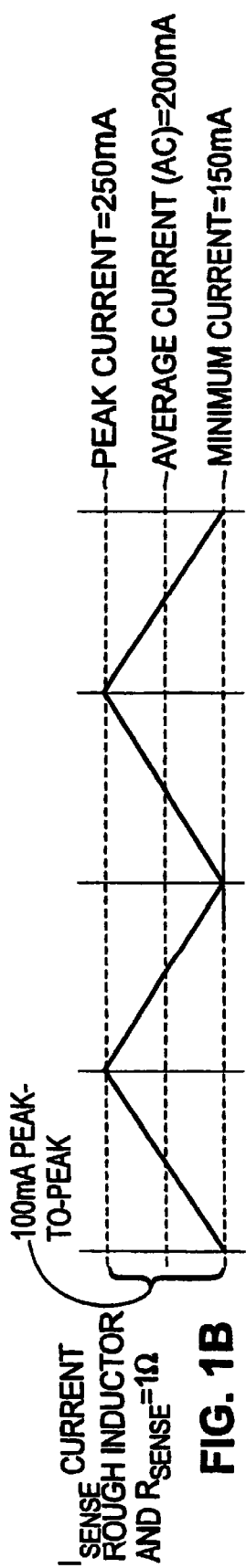
FIGS. 1B–1I show exemplary operating currents and voltages for the circuit of FIG. 1A implemented with specific component values and a specific input voltage.
Figure 1C:
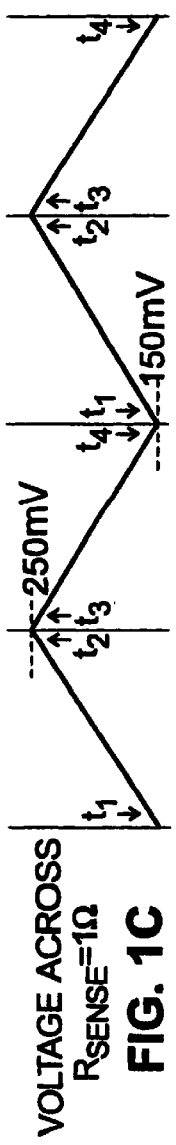
Figure 1D:
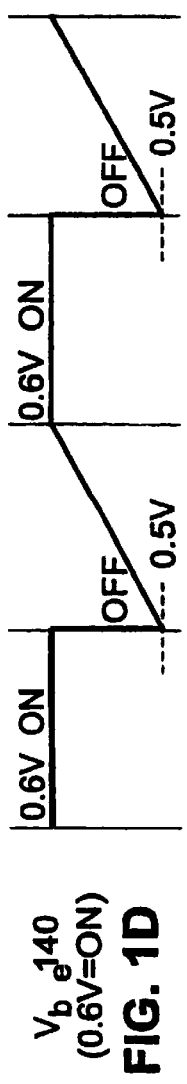
Figure 1E:
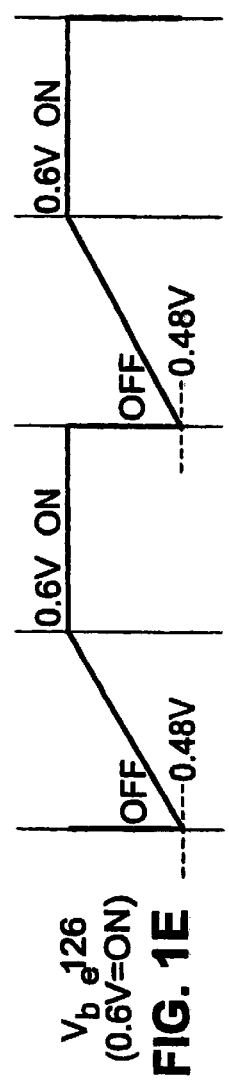
Figure 1F:
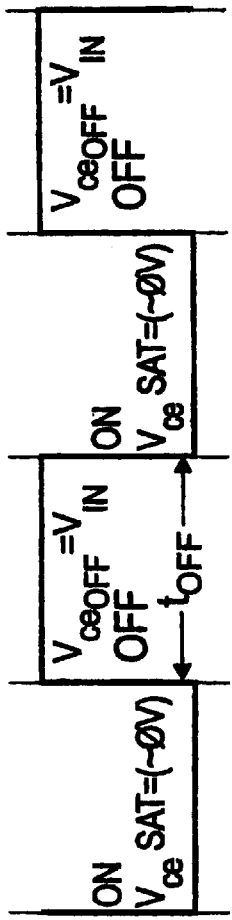
Figure 1G:
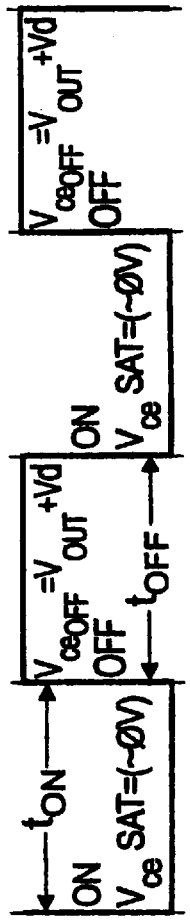
Figure 1H:
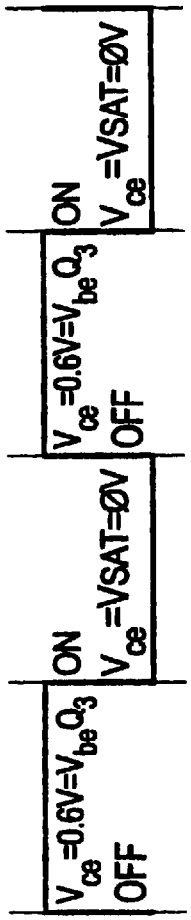
Figure 1I:
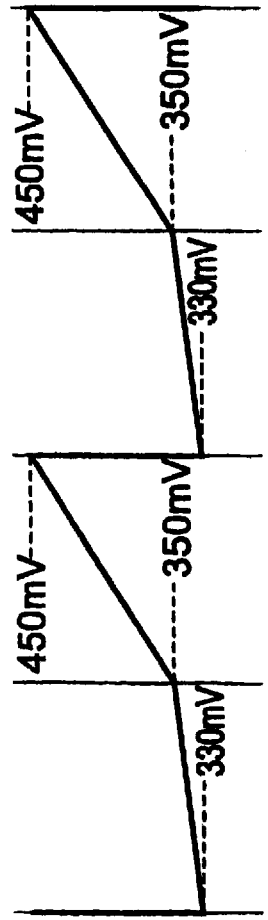

FIG. 1A is a schematic diagram illustrating a DC-to-DC converter 100 according to one aspect of the present invention. Converter 100 is configured in a BOOST topology. That is, the output voltage of converter 100 is greater than the input voltage to converter 100. Converter 100 includes first and second input terminals 112 and 114, respectively. A capacitor 116 is connected between the input terminals 112 and 114. In the typical operation of the converter 100, a voltage source is connected to first input terminal 112, while a reference or ground voltage is connected to a second input terminal 114. Terminal 112 is connected to the emitter of a first transistor or third switch 118, and the junction of a first terminal of a resistor 124 and the emitter of a second transistor or second switch 126. The second terminal of the resistor 124 is connected to the junction of a first terminal of an inductor 128 and the emitter of a third transistor or first switch 140. The second terminal of the inductor 128 is connected to the junction of the collector of a fourth transistor or fourth switch 144 and the anode of a diode 130. The cathode of the diode 130 is connected to a first output terminal 146 of converter 100. The first output terminal 146 is connected to a first terminal of a capacitor 148, the second terminal of which is connected to a second output terminal 150 of converter 100.

It will be recognized that although the drawing and textual discussion address separate terminals 114 and 150 and separate terminals may be employed, these terminals as drawn are in fact the same electrical node and the DC-to-DC converter can be viewed in its simplest form as a three terminal device with a single input, a single output and a common connection.

Returning to the transistor 118, the collector of transistor 118 is connected to the first terminal of a resistor 120. The second terminal of the resistor 120 is connected to a junction between the base of transistor 144 and the first terminal of resistor 122. The second terminal of the resistor 122 is connected to a junction held at ground or 0V as are a second terminal of a resistor 134, a second terminal of a resistor 138, the emitter of the transistor 144, the second input terminal of the converter 100 and the second output terminal of the converter 100.

Returning again to transistor 118, the base of transistor 118 is connected to a junction between the collector of transistor 126, a first terminal of a resistor 136, and the first terminal of the resistor 134. The base of transistor 126 is connected to a junction between the collector of transistor 140 and a first terminal of a resistor 142. The base of transistor 140 is connected to a junction between the second terminal of resistor 142, the second terminal of resistor 136, and the first terminal of resistor 138. The components 118, 124, 126, 136, 140 and 142 define a current sensing circuit and switching comparator with hysteresis 170. Control terminal 171 sets the current levels at which switching occurs.

The operation of the converter 100 is generally as follows. Transistor 140 switches ON and OFF depending on the voltage across the current-sensing or sense resistor 124. When transistor 140 is ON, it conducts an essentially constant current determined by $V_{in}$ and resistor 138. Transistor 126 operates as a saturated switch, and is either fully ON (saturated) or fully OFF, and alternates between these two states, depending on the current flow through, and therefore the voltage drop across the resistor 124.

Transistors 140 and 126 operate with opposite phasing. Transistors 118 and 144 operate in essentially the same way as transistor 126, but with opposite phasing. When transistor 144 is ON, current ramps up or increases in inductor 128, resistor 124 and transistor 144. When transistor 144 is OFF, current ramps down or decreases in inductor 128 and resistor124, and flows through diode 130 to the output of converter 100, at a voltage higher than the input voltage. A current passes through resistor 138, which is equal to the voltage across resistor 138 ($V_{in}$ minus the $V_{be}$ of transistor 140 plus the small voltage drop across resistor 124 which will be approximately 100–200 mV), divided by the value of resistor 138.

This current also flows through resistor 142, and causes the voltage at the base of transistor 126 to be higher than the voltage at the base of transistor 140, by an amount equal to the voltage across resistor 142. This causes transistor 126 to be biased OFF. If the current flowing through resistors 138 and 142 is essentially constant, and proportional to $V_{in}$, it will require a voltage drop across resistor 124, equal to the voltage drop across resistor 142, in order to cause transistor 126 to turn on. Since transistor 126 is OFF, transistors 118 and 144 will be ON.

Further, the current will be increasing in inductor 128 and resistor 124. When the voltage drop across resistor 124 just exceeds the voltage drop across resistor 142, transistor 126 will turn ON, and therefore transistors 118 and 144 will turn OFF. With transistor 144 OFF, the current through inductor 128 will decrease. When the voltage drop across resistor 124 is just less than the voltage drop across resistor 142, transistor 126 will again turn OFF, causing transistors 118 and 144 to turn ON. The cycle then repeats. Resistor 136 serves the important role of adding hysteresis or positive feedback to the voltage level seen at the base of transistor 126, thereby allowing clean switching without spurious oscillations around the turn-on threshold of transistor 126.

This hysteresis defines the turn-on and turn-off switching voltages of the second switch, the transistor 126. The amount of hysteresis is very well controlled, because the voltage level at the collector of transistor 126 is clamped in both the ON and the OFF state of operation of transistor 126. When transistor 126 is ON, it is saturated, and the voltage at the collector of transistor 126 is essentially $V_{in}$. When transistor 126 is OFF, the voltage at the collector of transistor 126 is clamped by transistor 118 to a level equal to $V_{in}$ minus the $V_{be}$ of transistor 118. Thus, the current switching thresholds of the circuit, are well defined and controllable by selecting the circuit values of the resistors 124, 142, 138 and 136. Depending upon the application, the resistor 138 might be a variable resistor which could be varied manually or automatically varied subject to processor control.

In the circuit shown in FIG. 1, there is a current threshold dependency on $V_{in}$. However, it is a simple matter to replace the resistor 138 with a constant current source, thereby rendering the switching current thresholds independent of $V_{in}$ and solely a function of the values of resistors 124, 142 and 136, and the current source. The necessary additional components are shown in FIG. 4 and will be discussed in further detail below.

For the BOOST converter, the OUTPUT current may be calculated from the parameters $V_{in}$, $V_{out}$, $I_{in}$ and the efficiency of the converter. $V_{out}$ has a wide compliance. That is, it can assume any value, but it must be greater than $V_{in}$ and have the same polarity. It can be seen that converter 100 is very simple in the sense that it has few connections, it has a very low part count, and can be very inexpensively constructed. It will be noted that the bulk of the components can be readily fabricated as a part of an integrated circuit (IC) or as a stand alone integrated circuit requiring only a very few external connections to connect to components such as an inductor or capacitors which are not readily or desirably fabricated on an IC.

FIGS. 1A–1I show exemplary operating currents and voltages for the circuit of FIG. 1A implemented with the resistor 138 replaced with a 3 mA constant current source and with the exemplary voltage and component values shown in the table below:

| | |
|---|---|
| $V_{in}$ | 5V DC |
| Capacitor 116 | 100 µF |
| Capacitor 148 | 100 µF |
| Transistor switch 118 ($Q_3$) | 2N3906 |
| Transistor switch 126 ($Q_2$) | 2N3906 |
| Transistor switch 140 ($Q_1$) | 2N3906 |
| Transistor switch 144 ($Q_4$) | ZTX690B |
| Resistor 120 | 330 Ω |
| Resistor 122 | 100 Ω |
| Resistor 124 ($R_{sense}$) | 1 Ω |
| Resistor 134 | 2000 Ω |
| Resistor 136 | 500 Ω |
| Resistor 142 | 100 Ω |
| Inductor 128 | 1 mH |
| Diode 130 | 1N5817 |

In FIGS. 1A–1I, at time, $t_1$, the transistor 144 is ON and the current, $I_{sense}$, through sense resistor 124 is ramping up. This current is substantially equal to the current through inductor 128 as the current through the transistor 140 is small with respect to $I_{sense}$. At time, $t_2$, the transistor 144 is ON and the current $I_{sesse}$ is about to reach its peak just before transistor 126 turns ON. At time, $t_3$, the transistor 144 is OFF and the current $I_{sense}$ is ramping down. Finally, at time, $t_4$, the transistor 144 is OFF with the current $I_{sense}$ about to reach its minimum just before the transistor 140 turns ON.

FIG. 2 is a schematic illustrating a DC-to-DC converter 200 according to another aspect of the present invention. The converter 200 is configured in a BUCK topology. That is, the output voltage of converter 200 is less than the input voltage. Converter 200 can be made of components identical to those used in converter 100, with the difference consisting in the arrangement of components. Therefore, the reference numerals used for the components of converter 200 are similar to those used for the components of converter 100. It will be recognized that a manufacturing line can advantageously be set up to make two or more different converters from essentially the same parts.

Converter 200 includes first and second input terminals 212 and 214, respectively, with a capacitor 216 connected between them. An input $V_{in}$ is provided to first input terminal 212, and second input terminal 214 is connected to a reference voltage which will usually be ground. Converter 200 also includes first and second output terminals 246 and 250, respectively, with a capacitor 248 connected between the output terminals 246 and 250. First output terminal 246 produces an output voltage $V_{out}$, and second output terminal is connected to a reference voltage which is the same as the reference voltage connected to input terminal 214 and which as noted above will usually be ground. First input terminal 212 is connected to an emitter of the transistor 244, the first terminal of a resistor 238, the first terminal of the resistor 234 and the first terminal of the resistor 222. The base of the transistor 244 is connected to the junction between the second terminal of resistor 222 and the first terminal of the resistor 220. The collector of transistor 244 is connected to the junction between the first terminal of the inductor 228 and the cathode of diode 230. The second terminal of the resistor 238 is connected to the junction between the first terminal of the resistor 236, the first terminal of the resistor 242 and the base of transistor 240. The collector of the transistor 240 is connected to the junction between the second terminal of the resistor 242 and the base of transistor 226, and the emitter of the transistor 240 is connected to a junction between the second terminal of the inductor 228 and the first input of the resistor 224.

The collector of transistor 226 is connected to the junction between the second terminal of the resistor 234, the second terminal of the resistor 236, and the base of the transistor 218. The emitter of transistor 226 is connected to the junction between the second terminal of the resistor 224, the emitter of the transistor 218, and the first output terminal 246 of converter 200. The second output terminal 250 is connected, as previously described, to capacitor 248, and also to the anode of diode 230 and second input terminal 214.

Returning now to transistor 218, the collector of transistor 218 is connected to the second terminal of resistor 220. The same functionality applies to the operation of converter 200 as to converter 100, but it should be noted that in the topology illustrated in FIG. 2, an output voltage $V_{out}$ will be produced which is less than $V_{in}$ and of the same polarity.

Figure 3:
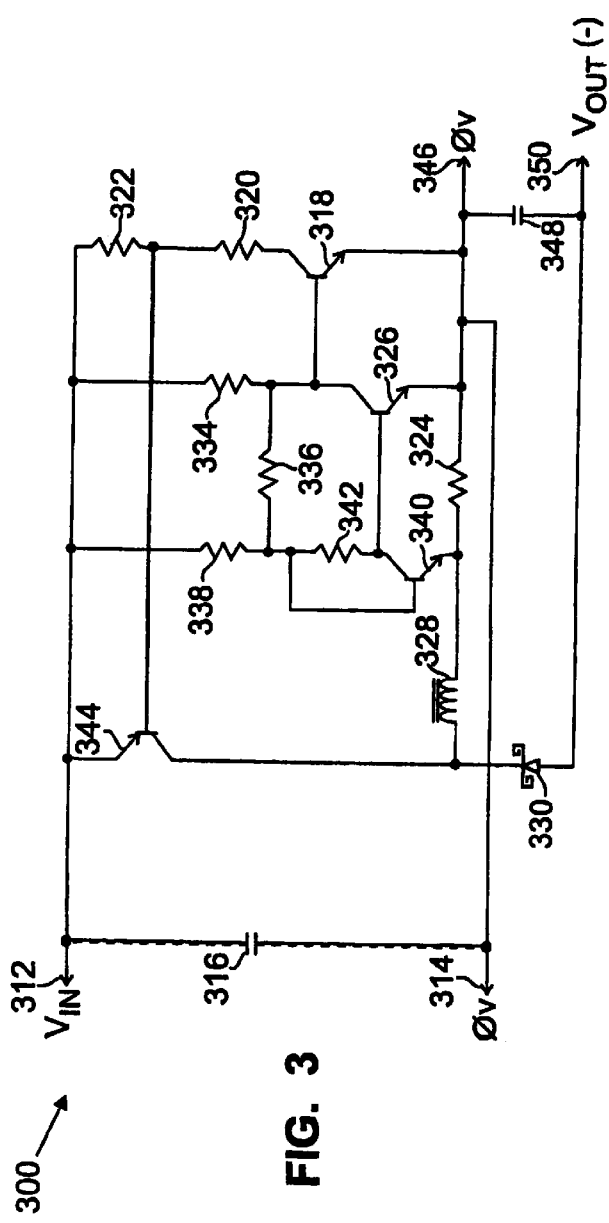
FIG. 3 is a schematic diagram illustrating a DC-to-DC converter current source according to the present invention, configured in an INVERTING topology.

FIG. 3 is a schematic illustrating a DC-to-DC converter 300 according to another aspect of the present invention. The illustrated topology is an INVERTING topology, producing an output voltage $V_{out}$ opposite in polarity to the input voltage $V_{in}$, and of any absolute value relative to $V_{in}$.

Converter 300 can be made of components identical to those used in converter 100, with the difference consisting in the arrangement of components. Therefore, the reference numerals used for the components of converter 300 are similar to those used for the components of converter 100. It will be recognized that a manufacturing line can advantageously be set up to make two or more different converters from essentially the same parts.

Converter 300 includes first and second input terminals 312 and 314, respectively, with capacitor 316 connected between input terminals 312 and 314. The input $V_{in}$ is provided to first input terminal 312, while second input terminal 314 is connected to a reference voltage which will usually be ground. Converter 300 also includes first and second output terminals 346 and 350, respectively, with a capacitor 348 connected between them. First output terminal 346 is connected to the reference voltage, and an output $V_{out}$ is produced at the second output terminal 350.

Input terminal 312 is connected to an emitter of a transistor 344, a first terminal of a resistor 338, a first terminal of a resistor 334 and a first terminal of a resistor 322. The base of the transistor 344 is connected to a junction between the second terminal of resistor 322 and a first terminal of a resistor 320. The collector of the transistor 344 is connected to a junction between a first terminal of an inductor 328 and the cathode of a diode 330. The second terminal of the resistor 338 is connected to a junction between the first terminal of a resistor 336, the first terminal of a resistor 342 and the base of a transistor 340. The collector of the transistor 340 is connected to a junction between the second terminal of the resistor 342 and the base of a transistor 326. The emitter of transistor 340 is connected to a junction between the second terminal of the inductor 328 and the first input of a resistor 324.

The collector of transistor 326 is connected to a junction between the second terminal of the resistor 334, the second terminal of the resistor 336, and the base of a transistor 318. The emitter of transistor 326 is connected to a junction between the second terminal of the resistor 324, the emitter of the transistor 318, the first output terminal 346 of converter 300, and the second input terminal 314 of converter 300. The second output terminal 350 is connected, as previously described, to capacitor 348, and also to the anode of diode 330. Returning now to transistor 318, the collector of transistor 318 is connected to the second terminal of resistor 320.

Figure 7:
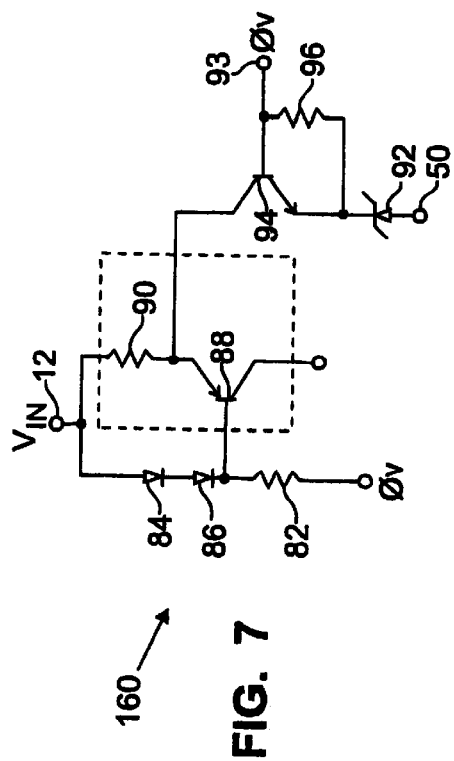
FIG. 7 is a schematic diagram illustrating a current source which, when used in an INVERTING topology DC-to-DC converter, achieves voltage regulation of the converter.

The DC-DC converter circuits when constructed as shown in FIGS. 1–3 are designed to operate with continuous inductor current. This means that there is always a DC component of current present in the inductor. The absolute current flowing in the inductor ramps up and down, as the power switch turns ON and OFF respectively. It is this same current which flows through the resistors 124, 224, 324 of FIGS. 1, 2 and 3 respectively. It is not intended for the current in the inductor to ramp down to 0 A. This restriction on operational current levels can cause problems, particularly if the circuit is to be used as a regulated voltage source DC-DC converter employing negative feedback and this circuit is used in an application that requires the output voltage to remain in regulation even when the attached load will draw little or no current. The invention can be readily adapted to operate under these conditions, as well as maintain nominal operation at higher output current levels, by the addition of a single resistor connected from the base terminal of the transistors 126, 226 and 326 of FIGS. 1, 2 and 3 respectively, to the input reference terminal in the case of FIG. 1, or the input terminal in the case of FIGS. 2 and 3. The addition of this resistor is necessary to allow the transistors 126, 226 and 326 to be able to turn ON, even when the programming current provided by the circuitry of FIGS. 5, 6 and 7 is set to 0 A. This assures that the power switch can always be turned OFF, should the regulated output voltage rise above the regulation limits.

The frequency at which the converter circuits 100, 200 or 300 will switch is dependent on many factors. These include the input and output voltage levels, the switching voltage thresholds and the amount of hysteresis selected via component value selection, as well as the inductance value for the inductor. Those skilled in the art will be able to readily calculate the switching frequency under any set of operating conditions. There is no limit to the range of switching frequencies which may be achieved, except as dictated by the switching characteristics of the selected components. Those skilled in the art will recognize the benefits of switching at higher frequencies. Principal among these benefits is that the physical size, cost and component value of capacitors and inductors generally decrease with increasing operating frequency. This may also be considered another advantage of this invention over the present art, in that the range of operating frequency is virtually unlimited, in contrast to present designs, which incorporate an oscillator "block" with inherent upper and lower limits on operational switching frequency.

As will be discussed in detail in connection with FIGS. 4–7 below, DC-to-DC converters according to the present invention can be used as regulated voltage sources, through the addition of a circuit consisting of a few simple components. As an alternative, the simplest implementation of a regulated voltage source may be achieved by adding a Zener diode 160 shown in FIG. 1A connected across the output terminals 146 and 150. Zener diode 160 will clamp the output voltage in a known fashion. The constant current supplied by the converter will be shared by the Zener diode and the load. A Zener diode could also be added to the converters of FIGS. 2 and 3. Anywhere a Zener diode appears in the drawings, any two or three terminal voltage reference or shunt regulator can be employed. Various examples of suitable devices are TL431, TLV431, LM385, ZR2341 and the like.

FIG. 4 is a schematic illustrating a current source circuit 80 for insertion in converter 100 illustrated in FIG. 1A, for the purpose of modifying the converter 100 so that the current regulated by the converter is independent of the magnitude of $V_{in}$. Current source circuit 80 includes a resistor 82, whose first terminal is preferably connected to the first input terminal 112 of converter 100. The second terminal of resistor 82 is connected to a junction between the base of a transistor 88 and the anode of diode 84. The cathode of diode 84 is connected to the anode of diode 86. The collector of transistor 88 is preferably connected to a node 171 connected to the base of the transistor 140 in converter 100. The emitter of transistor 88 is connected to a first terminal of a resistor 90. The second terminal of the resistor 90 is connected to a junction, usually held at ground, as are the cathode of diode 86 and, preferably, the second output terminal 150 of converter 100.

Current source circuit 80 is preferably inserted into converter 100 in place of the resistor 138. With current source circuit 80 employed in the converter 100, the current switching thresholds are independent of the input voltage into converter 100, and become a function solely of the values of resistors 124, 142 and 136 and the current set by the current source circuit 80.

FIG. 5 illustrates a current source circuit 80A, which is a modification of current source circuit 80. Current source circuit 80A is identical to current source circuit 80, except that an anode of a Zener diode 92 is connected between the emitter of transistor 88 and the first terminal of resistor 90. The cathode of Zener diode 92 forms an output terminal 93 of the current source circuit 80A. The current source circuit 80A is preferably employed in converter 100 as a substitute for resistor 138. Output terminal 93 of current source circuit 80A is preferably connected to output terminal 146 of converter 100. The addition of Zener diode 92 decreases the output power level of current regulator circuit 100 as the output voltage of converter 100 exceeds a level equal to the voltage across Zener diode 92 plus $V_d$. As Zener diode 92 begins to conduct, the current flowing through transistor 88 decreases by the amount flowing through Zener diode 92. Thus, the output voltage can be set and regulated.

When used in converter 100, current source circuit 80A adds negative feedback control to the converter and renders the current through converter 100 a function of the absolute output voltage of converter 100. Voltage regulation is therefore achieved, and converter 100 operates as a true voltage source, or voltage-output DC-to-DC converter power source. The current level is set by $V_d$ (approximately 0.6 VDC) divided by the value of resistor 90. This current level sets the maximum output power level of the converter.

FIG. 6 is a current source circuit 110 suitable for use in the BUCK topology converter 200. Current source circuit 110 includes a diode 84, whose anode is preferably connected to the first input terminal of converter 200. The cathode of the diode 84 is connected to the anode of a diode 86, whose cathode is connected to a junction between the base of a transistor 88 and a first terminal of a resistor 82. The second terminal of resistor 82 is connected to the reference voltage which is usually ground. The emitter of transistor 88 is connected to a junction between a collector of a transistor 94 and the second terminal of a resistor 90, whose first terminal is preferably connected to the first input terminal 212 of converter 200. The collector of transistor 88 is preferably connected to the base of transistor 240 in converter 200.

The base of transistor 94 is connected to a junction between a first terminal of a resistor 96, and, an output terminal 93 of current source circuit 110. The output terminal 93 of current source circuit 110 is preferably connected to output terminal 246 of converter 200. The second terminal of resistor 96 is connected to a junction between the emitter of transistor 94 and the cathode of a Zener diode 92, whose anode is connected to the reference voltage.

The current source circuit 110 is preferably employed in converter 200 in place of resistor 238. Transistor 94 and resistor 96 are employed to permit voltage level shifting by current source circuit 110, and the same principles apply to the use of current source circuit 110 in converter 200 as apply to the use of current source circuit 80A in converter 100. $V_{out}$ will be regulated to an absolute value equal to $V_{ZD1}$ which is the voltage across Zener diode 92 plus $V_d$ (or $V_{be}$ of transistor 94). $V_d$ essentially equals $V_{be}$=0.6 VDC.

FIG. 7 is a schematic diagram illustrating a current source circuit 160 for use in INVERTING topology converter 300. Current source circuit 160 is identical to current source circuit 110, except that output terminal 93 is connected to the reference voltage and the anode of Zener diode 92 is preferably connected to the output terminal 350 of converter 300. Again, $V_{out}$ will be regulated to an absolute value equal to $V_{ZD1}$ plus $V_d$ (or $V_{be}$ of transistor 94). $V_d$ essentially equals $V_{be}$=0.6 VDC.

Figure 8A:
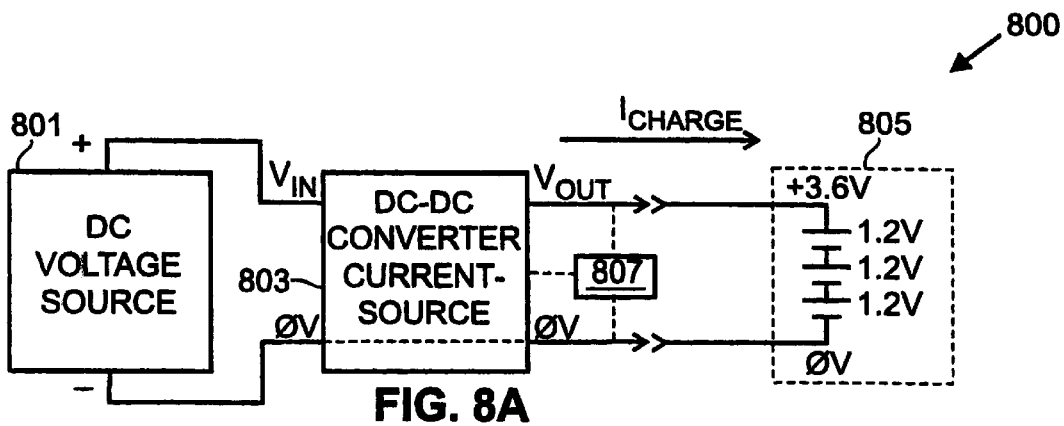
FIGS. 8A–8C illustrate various applications of converters in accordance with the present invention.
Figure 8B:
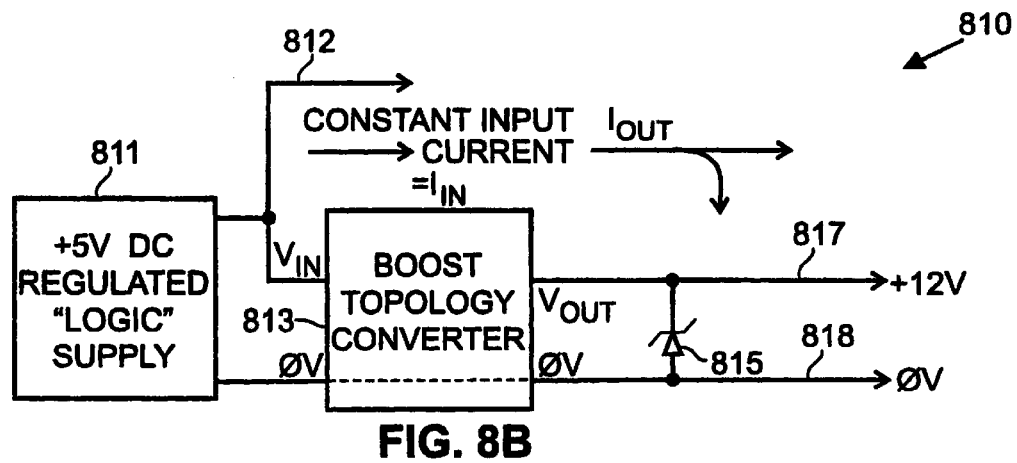
Figure 8C:
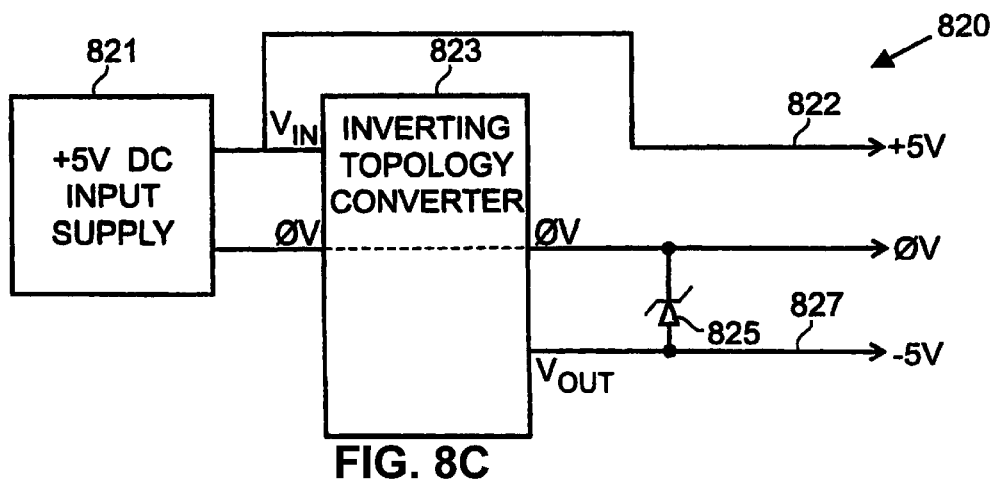

FIGS. 8A–8C illustrate several exemplary advantageous applications of converters in accordance with the present invention. FIG. 8A illustrates a simple battery charging circuit 800 in which a source of DC voltage 801 greater than the voltage of the battery or batteries to be charged is supplied to a buck topology converter 803 which may suitably be constructed as shown for the converter 200 of FIG. 2. The output voltage from the converter is supplied to a battery or battery stack 805. As shown in FIG. 8A, the battery stack 805 comprises three nickel-cadmium (NiCd) 1.2 volt (V) batteries so that the source 801 must supply a voltage greater than 3.6V. The source 801 may suitably be either a regulated or an unregulated source. An optional shunt regulator 807 may be employed for providing more precise output voltage regulation with or without negative feedback. The current output from converter 803 is a substantially constant charging current $I_{charge}$. Thus, a very simple and inexpensive battery charger can be constructed utilizing the teachings of the present invention.

FIG. 8B illustrates a step up voltage supply 810 in which a 5V DC regulated logic supply 811 is connected by a line 812 to provide +5V DC to logic circuits and the like requiring a regulated supply of 5V DC. The supply 810 is also connected to a boost topology converter 813 which may suitably be constructed like the converter 100 of FIG. 1A. A 12V Zener diode 815 is connected across the outputs of the converter 813. The supply 810 provides on output lines 817 and 818 a 12V supply which may suitably supply local analog or other circuits requiring a 12V supply. It will be recognized that $V_{in}$ could just as well be, 3V provided by a 3V lithium battery, 3.3V, or 3.6 provided by a NiCd battery stack or any other desired input voltage so long as $V_{in}$<$V_{out}$. A constant output current, $I_{out}$=$I_{in}$($V_{in}$/$V_{out}$) is provided by the supply 810.

FIG. 8C illustrates a bipolar power supply 820 formed in accordance with the present invention. In FIG. 8C, a 5V DC input supply 821 is connected to an inverting topology converter 823 which may suitably be constructed like the converter 300 shown in FIG. 3. The supply 821 is also connected by way of a connection 822 to load circuits requiring +5V DC. One output of the converter 823 is connected to a 5.1V Zener diode 825. The second output provides a −5V DC supply on a supply line 827 to load circuits requiring that supply voltage. Thus, it is seen that a bipolar power supply 820 is readily derived utilizing a single positive-only source 821. While a 5V DC source 821 is shown, higher or lower voltages such as 12V or 3.6V could also suitably be employed. With the correct selection of components, voltages as low as 0.8V could be employed.

While the present invention is disclosed in the context of a presently preferred embodiment, it will be recognized that a wide variety of implementations may be employed by persons of ordinary skill in the art consistent with the above discussion and the claims which follow below. As addressed above, the present invention provides a low-component-count, self-oscillating, switch-mode, DC to DC converter. It can be powered from a wide range of DC input voltages, and can produce a wide range of DC output voltages, by simply varying the values of a handful of components. It will be recognized that different resistors or alternatively a variable resistor or resistors may be employed depending upon the application. Importantly, the topology need not change. As several examples of suitable applications, the present invention is readily applicable as part of a low cost, flexible and highly reliable battery charger circuit, a regulated voltage source in any battery operated, portable electronic device where low cost is key, or in any application requiring a low cost DC-to-DC converter.

The present invention is well suited for creating localized sources of voltage on circuit boards where those voltages are not supplied. For example, suppose there is a circuit board designed for a mixed-signal application, that is, it contains both analog and digital circuitry. If the analog circuitry must interface with externally applied signals, the analog circuitry must usually be powered by supply voltages which exceed the magnitude of any applied input signals. If it is desired to power the analog circuitry from +15V, but the circuit board is 95% populated by digital circuitry running at +5V, it would not previously have been economically prudent to specify a power supply for the system which delivers both +5V and +15V, when the +5V demand is so much greater than the +15V demand. The invention as shown in FIG. 8B could be implemented right in the area of the analog circuitry, and produce +15V using the +5V as its power source. Further, any voltage, at any level of precision required by this circuitry could be produced by this invention, solely by selecting the correct value and precision of voltage clamping device across the output terminals of the invention.

While there are presently solutions to this commonly encountered problem, these involve DC/DC converter ICs or modules, as well as capacitive voltage doubler or multiplier ICs. The present invention has the advantages of lower cost, the option of operating with or without negative feedback, inherent stability considerations, plus the option of being able to separately chose the accuracy of the output voltage setting device, for example, a shunt regulator or Zener diode. The existing capacitive techniques have the disadvantage that they operate best generating output voltages which are discrete multiples of the input voltage, whereas the invention can produce virtually any voltage required.

The present invention provides a high degree of flexibility. For example, when a Zener diode is added across the output terminals of FIG. 2, that diode sets the output voltage as follows. For example, suppose the component values of FIG. 2 were chosen so that the converter delivers a constant 100 mA to the load. All that is required to set the desired output voltage is to chose an appropriate zener diode. For an output voltage of +5V, a 5.1V zener diode would be connected across the output terminals. The constant 100 mA output current of the converter would be shared between the zener diode and the load. In this configuration, the load could demand any current, from 0 mA up to 100 mA, and the output voltage would remain at 5.1V within the tolerances of the zener diode selected. When the load "needed" 100 mA, the Zener diode would conduct 0 mA, and when the load needed 0 mA, the Zener diode would conduct the full 100 mA output current of the converter.

Further advantages of using the present invention in a shunt-VOLTAGE-regulator topology are the following: 1) The switching frequency of the converter is more constant, as the operating current of the converter does not vary. The switching frequency will still vary however, as a function of the input voltage magnitude. 2) The benefit of inherent output current limiting and short-circuit protection is retained. Although operating efficiency suffers when the load demands less than the full output current of the converter, the efficiency when operating near full load is maximized. Thus, this circuit is best applied where the load circuit is known to draw a relatively constant current. Note shunt regulators fed by linear current sources are known to suffer from low efficiency, however, in this application, the shunt regulator device is fed by a switching-mode current source, and therefore has the high efficiency characteristic of switching-mode operation. 3) By allowing the output voltage clamping or shunt regulating device to be a separate device, the user can choose this device to meet the requirements of the application. For example, if extremely precise voltage regulation is required, a precise shunt voltage reference may be used. The voltage regulation accuracy is then solely a function of the accuracy of the shunt voltage regulator device chosen. If only nominal (5% or 10%) voltage regulation is required, an ordinary inexpensive zener diode may be chosen. Note that the zener diode, or shunt regulator chosen, must be able to handle the full output current of the converter. 4) The advertising literature for various company's switch-mode integrated circuits and their implementations tout ease-of-use and design as a feature. Also, these manufacturers offer simple design software to address users "fear" of designing switch mode circuits. The present invention has the advantage of being extremely simple to implement. In the shunt-regulator mode previously described, there is no negative feedback, and therefore no feedback loop to stabilize. The circuit is inherently stable, and will not oscillate. This should allow wide acceptance of this invention.

Additionally, the present invention is not restricted to non-isolated voltage conversion applications which are defined as applications where both the input and output voltages share the same reference terminal. The converters 100, 200 and 300 may be converted to an isolated design. Negative feedback may or may not be added.

Figure 9:
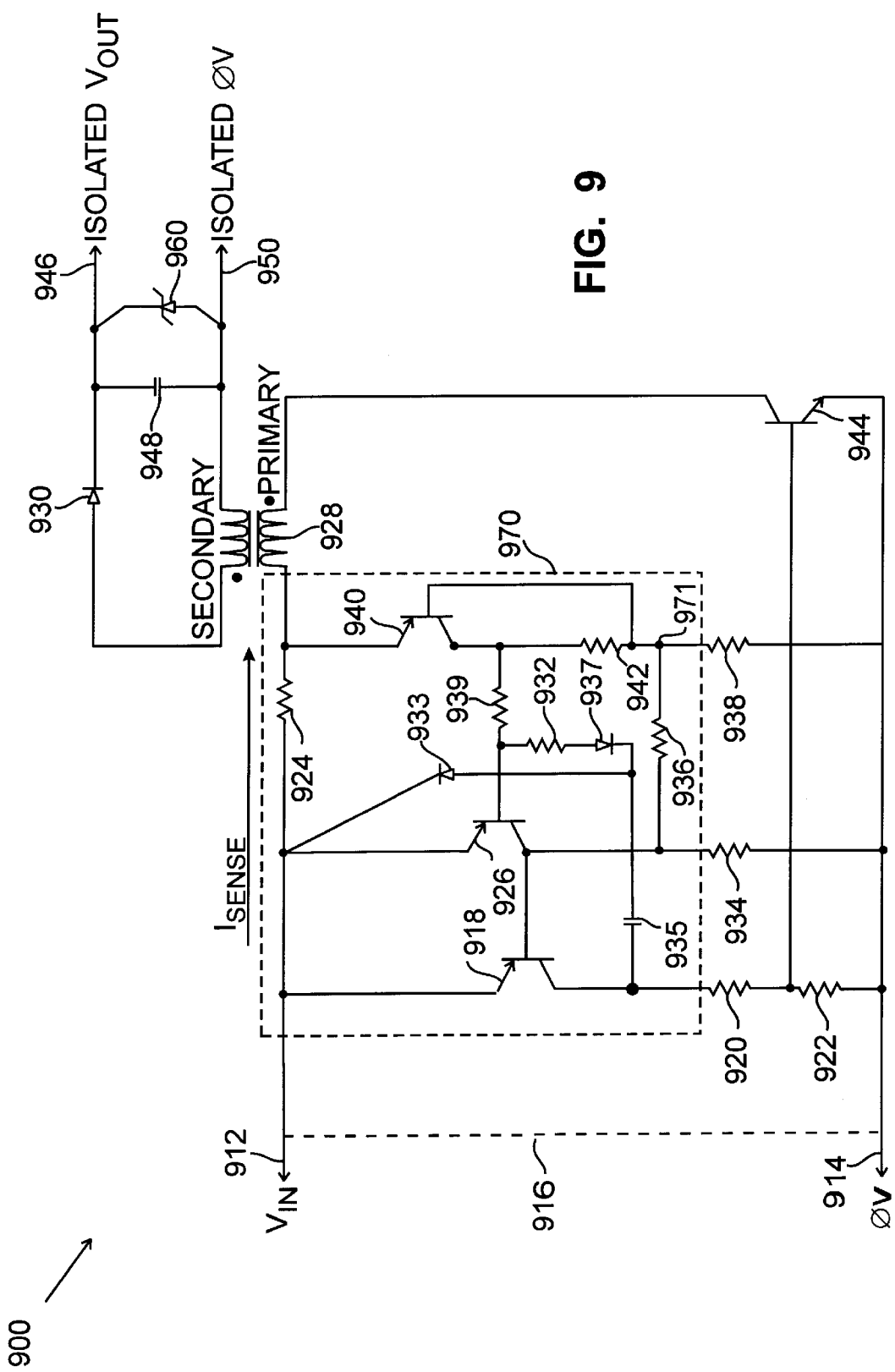
FIG. 9 is a schematic diagram illustrating an isolated DC-to-DC converter current source in accordance with the present invention.

An important application area for DC-to-DC converters is as isolated DC voltage or current sources. FIG. 9 is a schematic diagram illustrating an isolated DC-to-DC converter 900 according to one aspect of the present invention. Since many components of converter 900 are arranged in the same manner as the converter 100, like reference numerals are used to designate elements common to the two converters. Converter 900 is configured in an isolated boost topology.

Converter 900 includes first and second input terminals 912 and 914. In the typical operation of the converter 900, a voltage source is connected to first input terminal 912, while a reference or ground voltage is connected to second input terminal 914. Terminal 912 is connected to the junction of the emitter of a first transistor or third switch 918, a first terminal of resistor 924, the emitter of a second transistor or second switch 926, and the cathode of a diode 933. A second terminal of the resistor 924 is connected to the junction of a first terminal of a primary winding of a coupled inductor 928 and the emitter of a third transistor or first switch 940. A second terminal of the primary winding of the coupled inductor 928 is connected to the collector terminal of a fourth transistor or fourth switch 944. A first terminal of the secondary winding of the coupled inductor 928 is connected to the anode of a diode 930. The cathode of the diode 930 is connected to a first output terminal 946 of converter 900. The first output terminal 946 is connected to a first terminal of a capacitor 948 and the cathode terminal of a zener diode 960. The second terminal of the capacitor 948 is connected to a second output terminal 950 of converter 900. The anode terminal of the zener diode 960 is connected to the second output terminal 950. The second terminal of the secondary winding of the coupled inductor 928 is connected to the second output terminal 950.

Returning to the transistor 918, the collector terminal of transistor 918 is connected to a junction of the first terminal of a resistor 920 and the first terminal of the capacitor 935. The second terminal of the resistor 920 is connected to a junction between the base of transistor 944 and the first terminal of resistor 922. The second terminal of the resistor 922 is connected to a junction held at ground or 0V as are a second terminal of a resistor 934, a second terminal of a resistor 938, the emitter of the transistor 944, and the second input terminal of the converter 900.

Returning again to transistor 918, the base of transistor 918 is connected to a junction between the collector of transistor 926, a first terminal of a resistor 936, and the first terminal of the resistor 934. The base of transistor 926 is connected to a junction of a first terminal of a resistor 932, and a first terminal of a resistor 939. The collector of transistor 940 is connected to a junction between a first terminal of a resistor 942 and a second terminal of the resistor 939. The base of transistor 940 is connected to a junction between the second terminal of resistor 942, the second terminal of resistor 936, and the first terminal of resistor 938.

A second terminal of the capacitor 935 is connected to a junction between the anode of diode 933 and the cathode of diode 937. The anode of diode 937 is connected to a second terminal of resistor 932. The components 918, 924, 926, 936, 940, 942, 939, define a current sensing circuit and switching comparator with hysteresis, 970. Control terminal 971 sets the current levels at which switching occurs.

Galvanic isolation between input and output voltages is accomplished in converter 900 by the substitution of the dual-winding inductive element 928, in place of the single-winding inductor 128 in converter 100. The dual-winding inductor (also called a coupled inductor) provides galvanic isolation between input and output voltages. Further, it allows great flexibility in selecting the DC output voltage magnitude and polarity. The output voltage may be greater or less than the input voltage. It may also be of the same polarity, or of reverse polarity relative to the input voltage. The reference terminal 950 may be connected to any voltage potential, as it is truly a galvanically isolated (floating) output. The flexibility in output voltage magnitude is accomplished by varying the turns ratios of the two windings of the coupled inductor. The design of such a coupled-inductor is readily understood and accomplished by those skilled in the art. Another important benefit of the isolated converter 900 is that the output current is limited in the event of a short circuit across the output terminals. This is in contrast to the non-isolated boost converter 100 which does not limit output current in the event of a short-circuit across the output terminals. The other principal circuit differences between the converter 100 and the isolated converter 900 are the additions of resistors 932, and 939, diodes 933 and 937, and capacitor 935. These components comprise a deadtime circuit.

The operation of the converter 900 is generally as follows. The converter has only two operating states ON and OFF. These states shall reflect the operating condition of the main power switching transistor 944. When transistor 944 is ON, current will be drawn from the input supply terminal 912, through current-sensing resistor 924, and through the primary winding of coupled inductor 928. The inductance in coupled inductor 928 resists an instantaneous change in current, and thus causes this current to ramp-up in a linear fashion. Transistor 940 operates in a linear mode. It conducts an essentially constant current determined substantially by $V_{in}$ and resistor 938. Transistor 926 operates as a saturated switch, and is either fully ON (saturated) or fully OFF. During the converter ON state, transistor 926 is OFF Transistors 918 and 944 operate in essentially the same way as transistor 926, either fully ON and (saturated) or fully OFF, but with opposite phasing compared to 926. While transistor 944 is ON, the phasing of the primary and secondary coupled inductor windings (indicated by the "dots" adjacent to each winding), causes a reverse voltage to be applied at diode 930. Thus, the diode 930 is blocking (non-conducting), and the current through the secondary winding of the coupled inductor 928 is zero. During this converter ON state, a current passes through resistor 938, which is equal to the voltage across resistor 938 ($V_{in}$ minus the $V_{be}$ of transistor 940 plus the small voltage drop across resistor 924 which will be approximately 100–200 mV), divided by the value of resistor 938. A current also passes through resistor 936, flowing towards terminal 971. This current is equal to the voltage across 936, divided by its value. If we assume the $V_{be}$ of transistors 940 and 918 to be equal (at approx. 0.6V), it can be seen that the voltage across resistor 936 is also equal to the voltage across resistor 924 during the converter ON time. The current flowing through resistor 938, minus the current flowing through 936, is the current that flows through resistor 942. This current causes the voltage at the base of transistor 926 to be higher than the voltage at the base of transistor 940 by an amount equal to the voltage across resistor 942. This causes transistor 926 to be biased OFF. It will require a voltage drop across resistor 924 equal to the voltage drop across resistor 942 to cause transistor 926 to turn on. This is defined as the upper switching current threshold. The small base current required to cause transistor 926 to turn ON is drawn through resistor 939. However, since resistor 939 is a relatively small value (approx. 1000 ohms), and the current small, the voltage drop across resistor 939 is negligible relative to the voltage drop across resistor 942. When transistor 926 turns ON, it will then cause transistors 918 and 944 to turn OFF, beginning what we have defined as the converter OFF time. During the converter 900 OFF time, operation of the isolated converter 900 differs from the non-isolated converter 100. In the non-isolated converter 100, when transistor 944 switches OFF, current begins to ramp down linearly in the inductor 128, approaching the lower switching current threshold. In the isolated converter 900, when transistor 944 switches OFF, the current flowing through the primary winding of coupled-inductor 928 goes to zero instantly, rather than ramping-down linearly. The energy that had been stored in coupled-inductor 928 during the converter ON time is now transferred through the secondary winding to the capacitor 948, Zener diode 960, and any load connected across the isolated output terminals. Since the primary winding current through coupled-inductor 928 goes to zero, so also does the voltage across resistor 924. Thus, a lower switching current threshold cannot be used, as this threshold cannot be set less than zero. Therefore a modification is required for the isolated converter 900. This modification takes the form of a deadtime circuit consisting of the components 935, 933, 937, 932, and 939, which were not present in the non-isolated converter 100.

In the non-isolated converter 100, the converter OFF time would end when the sensed current through resistor 924 fell below the current comparator's 170 lower current threshold. In the isolated converter 900, the OFF time is a FIXED time interval determined by the component values in the deadtime circuit. The deadtime circuit functions to create a fixed OFF time interval in the following manner. When transistor 926 first switches ON to begin the converter OFF time, it pulls the first terminal of hysteresis resistor 936 up to a voltage substantially equal to the terminal 912 (Vin). This causes more current to flow through resistor 936 into control terminal 971, and a decrease in current supplied by transistor 940 through resistor 942. Thus the voltage across resistor 942 will decrease causing transistor 926 to be driven ON further (deeper into saturation) by this local positive feedback. Since transistor 926 is now ON, transistor 918 will switch OFF. This will cause the collector voltage of 918 and the first terminal of capacitor 935 to fall towards ground. Capacitor 935 will then acquire a charge, by the charging current flowing through it, from the base of transistor 926, resistor 932, diode 937, and resistors 920 and 922. This charge will develop a voltage on capacitor 935, which will cause the second terminal of capacitor 935 to be positive with respect to its first terminal. The voltage on capacitor 935 will approach a final value of $V_{in} - V_{be(926)} - Vdiode_{937} = V_{in} - 1.2V$. While this charging current is flowing, transistor 926 will remain ON, and the converter OFF time interval will continue. The time constant ($\tau$) for this deadtime circuit is determined by the values of resistors 920, 922, 932, and capacitor 935. The ratio of resistor values is selected so that the charging current through capacitor 935 does not develop a voltage greater than 0.3V across resistor 922, allowing transistor 944 to switch off rapidly. As stated above, when transistor 944 switches OFF, the voltage across 924 falls to zero, and the voltage at the base of transistor 940 (control terminal 971) becomes more positive. Resistor 939 prevents the capacitor charging current from then being drawn through resistor 942 and the base of transistor 940. This could cause erroneous circuit operation by causing transistor 940 to oscillate. Instead, resistor 939 allows transistor 940 to remain in a linear operating mode throughout the OFF time of the converter 900. When capacitor 935 has almost charged completely, the charging current drawn from the base of transistor 926 will decrease, causing 926 to switch OFF. When this occurs, local positive feedback is again applied to the base of 926 through the hysteresis action afforded by resistor 936 and its effect on control terminal 971. This action is identical to the detailed operational description provided for converter 100. When transistor 926 switches OFF, transistor 918 will switch ON and saturate, pulling the first terminal of capacitor 935 positive, to a voltage substantially equal to Vin (912). The voltage across any capacitor may not change instantaneously, and the voltage on capacitor 935 had already been established during the converter OFF time, with its second terminal positive with respect to its first terminal. Now, with its first terminal being pulled to Vin, the second terminal of capacitor 935 would rise toward a voltage more positive than Vin, were it not for the clamping action of diode 933 which clamps the second terminal of capacitor 935 to a voltage just 0.6V more positive than $V_{in}$. The diode 937 is reversed biased and therefore isolates the base of transistor 926 from the capacitor 935. During the converter ON time, capacitor 935 will be effectively discharged to a voltage equal to 0.6V, with its second terminal remaining positive with respect to its first terminal. Capacitor 935 is now ready to be charged again during the next fixed OFF time interval.

When transistor 944 switches OFF, current can no longer flow through the primary winding of coupled-inductor 928 and resistor 924. The inductance of the primary winding of coupled-inductor 928 will cause the voltage at the collector of transistor 944 to rise (flyback) to a voltage greater than Vin (terminal 912). Thus the voltage across the primary winding of coupled-inductor 928 has now reversed polarity. This polarity reversal of the voltage across the primary winding of coupled-inductor 928 causes a voltage polarity reversal across the secondary winding of coupled-inductor 928, and results in diode 930 now becoming forward biased. Current will now flow in the secondary winding of coupled-inductor 928 through diode 930. The energy that has been stored by the primary winding inductance of 928, at the instant that transistor 944 switches OFF, is equal to ½ Lp Ip², where Lp is the inductance of the primary winding of coupled-inductor 928, and Ip is the current magnitude at the instant transistor 944 switches OFF. This stored energy is released through the secondary winding of coupled-inductor 928, and is equal to ½ Ls Is² where Ls is the inductance of the secondary winding of coupled-inductor 928, and Is is the current magnitude in the secondary winding of coupled-inductor 928. Since Lp and Ls are related by the turns ratio of the windings of coupled-inductor 928, it is a simple matter for those skilled in the art to design component 928 such that the correct amount of energy is delivered to the secondary circuit and the load during each "OFF" cycle of the converter 900. In the simplest case, where the number of primary winding turns equals the number of secondary winding turns, Lp will equal Ls, and Ip will equal Is.

Returning to resistor 936. Resistor 936 serves the important role of adding hysteresis or local positive feedback to the voltage level seen at the base of transistor 926, thereby allowing clean switching without spurious oscillations around the turn-on and turn-off thresholds of transistor 926.

This hysteresis defines the turn-on switching voltage threshold of the second switch, the transistor 926. The amount of hysteresis is very well controlled, because the voltage level at the collector of transistor 926 is clamped in both the ON and the OFF state of operation of transistor 926. When transistor 926 is ON, it is saturated, and the voltage at the collector of transistor 926 is essentially $V_{in}$. When transistor 926 is OFF, the voltage at the collector of transistor 926 is clamped by transistor 918 to a level equal to $V_{in}$ minus the $V_{be}$ of transistor 918. Thus, the upper current switching threshold of the circuit, is well defined and controllable by selecting the circuit values of the resistors 924, 942, 938 and 936. Depending upon the application, the resistor 938 might be a variable resistor which could be varied manually or automatically varied subject to processor control.

In the circuit shown in FIG. 9, there is a current threshold dependency on $V_{in}$. However, it is a simple matter to replace the resistor 938 with a constant current source, thereby rendering the upper switching current threshold independent of $V_{in}$ and solely a function of the values of resistors 924, 942 and 936, and the current source.

It can be seen that converter 900 is very simple in the sense that it has few connections, it has a very low parts count, and can be very inexpensively constructed. It will be noted that the bulk of the components can be readily fabricated as a part of an integrated circuit (IC) or as a stand alone integrated circuit requiring only a very few external connections to connect to components such as an inductor or capacitors which are not readily or desirably fabricated on an IC.

A simple implementation of a shunt-regulated isolated VOLTAGE source may be achieved by adding a Zener diode 960 as shown in FIG. 9 connected across the output terminals 946 and 950. Zener diode 960 will clamp the output voltage in a known fashion. The constant current supplied by the converter will be shared by the Zener diode and the load.

An implementation of a feedback-regulated isolated VOLTAGE source may be achieved by sensing the isolated output voltage across the output terminals 946 and 950, and using this voltage to control the amount of current drawn from control terminal 971. As described above, the switched current level is directly proportional to the control current drawn from terminal 971. Those skilled in the art, in light of the present teachings, can incorporate the additional components necessary to achieve this described functionality.

Figure 10:
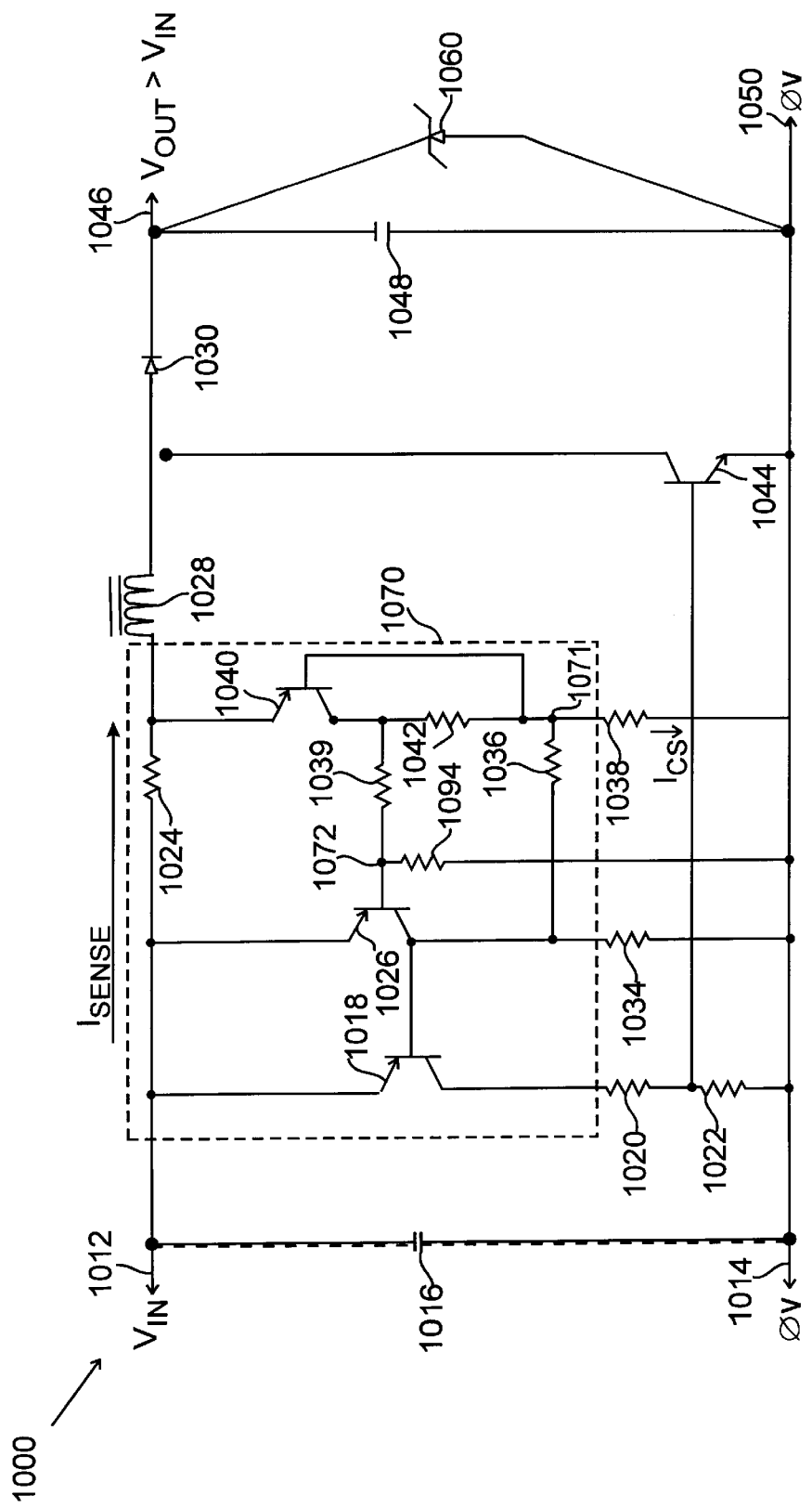
FIG. 10 is a schematic diagram illustrating a DC-to-DC converter current source configured in the BOOST topology in accordance with another aspect of the present invention.

FIG. 10 is a schematic diagram illustrating a DC-to-DC converter 1000 according to another aspect of the present invention. Since many components of converter 1000 are arranged in the same manner as the converter 100, like reference numerals are used to designate elements common to the two converters. Converter 1000 includes all the circuit elements of converter 100 plus additional resistors which modify the operation of the circuit as compared to converter 100. It is the intent of this disclosure to explain the operational changes afforded to converter 100 by the additions of these individual circuit elements. Converter 1000 is configured in a BOOST topology. That is, the output voltage of converter 1000 is greater than the input voltage to converter 1000. Converter 1000 includes first and second input terminals 1012 and 1014, respectively. A capacitor 1016 is connected between the input terminals 1012 and 1014. In the typical operation of the converter 1000, a voltage source is connected to first input terminal 1012, while a reference or ground voltage is connected to a second input terminal 1014. Terminal 1012 is connected to the junction of the emitter of a first transistor or third switch 1018, the emitter of a second transistor or second switch 1026, and a first terminal of a resistor 1024. The second terminal of the resistor 1024 is connected to the junction of the emitter of a third transistor or first switch 1040, and a first terminal of an inductor 1028. The second terminal of the inductor 1028 is connected to the junction of the collector of a fourth transistor or fourth switch 1044 and the anode of a diode 1030. The cathode of the diode 1030 is connected to a first output terminal 1046 of converter 1000. The first output terminal 1046 is connected to the junction of a first terminal of a capacitor 1048 and a first terminal of a zener diode 1060. The second output terminal 1050 of converter 1000 is connected to a second terminal of the capacitor 1048 and a second terminal of the zener diode 1060.

It will be recognized that although the drawing and textual discussion address separate terminals 1014 and 1050 and separate terminals may be employed, these terminals as drawn are in fact the same electrical node and the DC-to-DC converter can be viewed in its simplest form as a three terminal device with a single input, a single output and a common connection.

Returning to the transistor 1018, the collector of transistor 1018 is connected to the first terminal of a resistor 1020. The second terminal of the resistor 1020 is connected to a junction between the base of transistor 1044 and the first terminal of resistor 1022. The second terminal of the resistor 1022 is connected to a junction held at ground or 0V as are a second terminal of a resistor 1034, a second terminal of a resistor 1038, the second terminal of a resistor 1094, the emitter of the transistor 1044, the second input terminal 1014 and the second output terminal 1050.

Returning again to transistor 1018, the base of transistor 1018 is connected to a junction between the collector of transistor 1026, a first terminal of a resistor 1036, and the first terminal of the resistor 1034. The base of transistor 1026 is connected to a first terminal of a resistor 1039 and a first terminal of resistor 1094. A second terminal of the resistor 1039 is connected to the junction of the collector of transistor 1040 and a first terminal of a resistor 1042. The base of transistor 1040 is connected to a junction of the second terminal of resistor 1042, the second terminal of resistor 1036, and the first terminal of resistor 1038. The components 1018, 1024, 1026, 1036, 1040, 1042, 1039, and 1094 define a current sensing circuit and switching comparator with hysteresis 1070. Control terminals 1071 and 1072 set the current levels at which switching occurs.

The circuit schematic and operation of the converter 1000 is identical to that of converter 100, if resistor 1039 were 0 ohms, and resistor 1094 removed. The addition of these resistors has a specific effect on, and alters the operation of converter 100 in specific ways. In converter 100, transistor 140 switches ON and OFF depending on the voltage across the current-sensing or sense resistor 124. When transistor 140 is ON, it conducts an essentially constant current determined by $V_{in}$ and resistor 138. In converter 1000, the addition of resistor 1039 allows transistor 1040 to remain ON, and operating in a linear mode at all times. Transistor 1040 does not switch OFF. Transistor 1026 in converter 1000 operates identically to transistor 126 in converter 100. Transistor 1026 operates as a saturated switch, and is either fully ON (saturated) or fully OFF, and alternates between these two states, depending on the current flow through, and therefore the voltage drop across the resistor 1024.

Transistors 1018 and 1044 operate in essentially the same way as transistor 1026, but with opposite phasing compared to transistor 1026. When transistor 1044 is ON, current ramps up or increases in inductor 1028, resistor 1024 and transistor 1044. When transistor 1044 is OFF, the voltage at the collector of transistor 1044 will rise to a voltage more positive than the input voltage, Vin, and current will ramp down or decrease in inductor 1028 and resistor 1024. This current then flows through diode 1030 to the output of converter 1000, at a voltage more positive than the input voltage. A current passes through resistor 1038 which is equal to the following expression: $V_{in}$ minus the small voltage drop across resistor 1024 (which will be approximately 100–200 mV), minus the $V_{be}$ of transistor 1040, divided by the value of resistor 1038.

This current also flows through resistor 1042, and causes the voltage at the base of transistor 1026 to be higher than the voltage at the base of transistor 1040, by an amount equal to the voltage across resistor 1042. This causes transistor 1026 to be biased OFF. When transistor 1026 is OFF, transistors 1018 and 1044 will be ON.

Since transistor 1044 is ON, the current will be increasing in inductor 1028 and resistor 1024. When the voltage drop across resistor 1024 just exceeds the voltage drop across resistor 1042, transistor 1026 will turn ON, and therefore transistors 1018 and 1044 will turn OFF. With transistor 1044 OFF, the current through inductor 1028 will decrease. When the voltage drop across resistor 1024 is just less than the voltage drop across resistor 1042, transistor 1026 will again turn OFF, causing transistors 1018 and 1044 to turn ON. The cycle then repeats. Resistor 1036 serves the function of adding local hysteresis or positive feedback to the voltage level seen at the base of transistor 1026, thereby allowing clean switching without spurious oscillations around the turn-on threshold of transistor 1026. The hysteresis defines the turn-on and turn-off switching voltages of the second switch, the transistor 1026.

The amount of hysteresis afforded by resistor 1036 is very well controlled because the voltage level at the collector of transistor 1026 is clamped in both the ON and the OFF state of operation of transistor 1026. When transistor 1026 is ON, it is saturated, and the voltage at the collector of transistor 1026 is essentially equal to $V_{in}$. When transistor 1026 is OFF, the voltage at the collector of transistor 1026 is clamped by the base-emitter junction of transistor 1018 to a level equal to $V_{in}$ minus the $V_{be}$ of transistor 1018. To explain the operation of the preferred embodiment of comparator circuit 1070, we will consider the case where resistor 1094 is absent. Resistors 1042, 1036 and 1039 are present, and resistor 1038 has been replaced with a constant current source $I_{cs}$, through which the current $I_{1038}$ flows. This constant current source $I_{CS}$ sinks a fixed current $I_{1038}$ from control terminal 1071, and is described in FIG. 4, and discussed in further detail in relation to the converter 100 of FIG. 1. As stated above, when transistor 1026 is OFF, the voltage at the first terminal of resistor 1036 will be Vin minus $V_{be}$ of transistor 1018. The voltage at the second terminal of resistor 1036 will be Vin, minus the voltage across resistor 1024, minus $V_{be}$ of transistor 1040. Therefore, assuming the $V_{be}$'s of transistors 1018 and 1040 to be equal, it can be seen that the voltage across resistor 1036 will equal the voltage across resistor 1024, whenever transistor 1026 is OFF. Thus the voltage across resistor 1036, and therefore the current through it ($I_{1036}$) are well defined. This current $I_{1036}$ flows into control terminal 1071, summing with the current through resistor 1042 ($I_{1042}$). The sum of currents $I_{1036}$ and $I_{1042}$ must equal the fixed current $I_{1038}$, since it can be assumed that the base current flowing from the base of transistor 1040 is negligible due to the high current gain characteristic of transistor 1040, operating in its linear mode. Since the sum of resistor currents $I_{1036}$ and $I_{1042}$ must be equal to the current source $I_{1038}$, then it follows that a decrease in current through resistor 1036 will result in an increase in current through resistor 1042, and therefore an increase in the voltage across resistor 1042. This increase in the voltage across resistor 1042 occurs while transistor 1026 is OFF, and transistors 1018 and 1044 are ON, and current is ramping-up in sense-resistor 1024 and inductor 1028. The upper switching current threshold is now defined by the voltage across resistor 1042, and is the point at which transistor 1026 will again turn ON. This will occur when the voltage drop across resistor 1024 increases to a point where it is equal to the voltage drop across resistor 1042, that voltage having been established by the comparator circuit and hysteresis afforded by resistor 1036. At this upper current switching threshold, transistor 1026 will begin to turn ON when its $V_{be}$ reaches the turn on threshold of approx. 0.6V. In this embodiment, transistor 1040 is always biased ON and in its linear operating mode. We can then assume that the Vbe-ON of transistor 1040 is also 0.6V. Therefore, from the circuit diagram we can draw the relation: $Vbe_{1026}+V_{1042}=Vbe_{1040}+V_{1024}$. Since we have assumed the Vbe-ON voltage for both transistors 1026 and 1040 to be 0.6V, the relation reduces to: $V_{1042}=V_{1024}$. Thus transistor 1026 will turn ON when the voltage across sense resistor 1024 becomes equal to the voltage that has been established across resistor 1042 by the comparator circuit.

Once transistor 1026 has turned ON, transistors 1018 and 1044 will switch OFF, and current will begin to ramp-down in inductor 1028, as this current flows through diode 1030 to the output. During this ON time of the converter, a new current threshold is established by the comparator circuit. This current threshold is called the lower current switching threshold. This threshold is established as follows. When transistor 1026 switches ON, its collector terminal and the first terminal of resistor 1036, are pulled positive, to a potential substantially equal to Vin. The voltage at control terminal 1071 (and the second terminal of resistor 1036) is equal to Vin minus the voltage across sense resistor 1024 and the Vbe of transistor 1040. Since the current through the inductor 1028 and therefore the current through sense resistor 1024 cannot change instantaneously, the voltage at control terminal 1071 has not changed substantially immediately after the turn-on of transistor 1026. Therefore it can be seen that the turn-on of transistor 1026 has resulted in an immediate increase in voltage across resistor 1036. This increase in the voltage across resistor 1036, and thus the current through it ($I_{1036}$) results in an equal decrease in current through resistor 1042, in order to maintain the constant current $I_{1038}$. The decrease in current through, and voltage across resistor 1042 results in a difference voltage being established across resistor 1039. This voltage across resistor 1039 is exactly equal to the decrease in voltage across resistor 1042, and represents base current flowing from transistor 1026. Thus increased base current turns transistor 1026 ON harder, and drives it into saturation. This illustrates the positive feedback mechanism of the current comparator circuit 1070 around the upper current switching threshold. The presence of resistor 1039 in this embodiment allows transistor 1040 to remain in its linear operating mode during the OFF time of transistor 1026. This is in contrast to the embodiment of converter 100, where transistor 1040 switched OFF whenever transistor 1026 switched ON. This slight difference in operation does not change the upper and lower current switching thresholds of the current comparator circuit. Also, the presence of resistor 1039 has another benefit that will be discussed later in this disclosure.

Returning to the operational explanation of the current comparator 1070. The lower current switching threshold will occur when the current through sense resistor 1024 has ramped-down to the point where the voltage across resistor 1024 again equals the decreased voltage established across resistor 1042 by the hysteresis mechanism just explained. At this point, the voltage across resistor 1039 will drop to 0A, and transistor 1026 will begin to switch OFF. As this occurs, the collector terminal of transistor 1026 and the first terminal of resistor 1036 will decrease in voltage as transistor 1026 comes out of saturation and begins to turn off. The voltage at the collector terminal will finally be clamped at Vin minus Vbe of transistor 1018. Again, the voltage at control terminal 1071, and the second terminal of resistor 1036 cannot change instantaneously, because the current through inductor 1028 and resistor 1024 cannot change instantaneously. Thus there is a net decrease in the voltage across, and current through resistor 1036 that will result in a corresponding increase in the current through, and voltage across resistor 1042. This increased voltage across 1042 will cause the base terminal of transistor 1026 to become more positive relative to its emitter terminal therefore turning OFF transistor 1026 even more. This again illustrates positive feedback around the lower current switching threshold of the comparator circuit. Once transistor 1026 has turned fully OFF, transistors 1018 and 1044 switch ON again, and current begins to ramp up again towards the upper current switching threshold, as the switching cycle repeats.

The operation of the current comparator circuit 1070, can also be explained by the following design equations governing its operation. These equations can be used to select proper values for the critical components based on the upper and lower current switching thresholds desired.

EQUATION 1) Valid at Upper Current Switching Threshold:

$$(V_{sense-Upper}/R_{1036})+(V_{sense-Upper}/R_{1042})=Ics$$

EQUATION 2) Valid at Lower Current Switching Threshold:

$$((V_{sense-Lower}+Vbe)/R_{1036})+(V_{sense-Lower}/R_{1042})=Ics$$

A simple design sequence to be followed, is to first assign the desired upper and lower current switching thresholds for the circuit. These should then be converted to voltages across resistor 1024 by correct value selection of resistor 1024. These upper and lower threshold voltages will be $V_{sense-Upper}$ and $V_{sense-Lower}$ in equations 1 and 2. It is recommended that $V_{sense-Upper}$ should not exceed 0.4V and $V_{sense-Lower}$ not be less than 0V.

The next step is to assign a value for the constant current source Ics which is $I_{1038}$ in the operational description. This value can range widely, but a recommended value would fall in the range of 1 mA to 5 mA. With this value of Ics assigned, equations 1 and 2 can then be solved as a system of two equations and two unknowns, the 2 unknowns being the value of resistor 1042 equals $R_{1042}$ and the value of resistor 1036=$R_{1036}$.

It can therefore be understood, that the current switching thresholds of the circuit, are well defined and controllable by selecting the circuit values of the resistors 1024, 1042, and 1036, as well as current source Ics. Depending upon the application, a variable current source could be used in place of constant current source Ics, to allow $I_{in}$ and $I_{out}$ to be varied. Alternately, if the resistor 1038 could be used, or a variable resistor which could be manually or automatically varied subject to processor control. If resistor 1038 is used, the upper and lower switching current thresholds will display a dependency on the value of $V_{in}$.

For the BOOST converter with continuous inductor current, as discussed in this invention, the continuous inductor current is bounded between upper and lower switching current thresholds. Further, the average DC value of this inductor current is the arithmetic average of the upper and lower current switching thresholds. Further, this DC current value is the DC input current for the converter ($I_{in}$). The OUTPUT current for the converter may be calculated from the parameters $V_{in}$, $V_{out}$, $I_{in}$ and the efficiency of the converter ($\eta$). $V_{out}$ has a wide compliance. That is, it can assume any value, but it must be greater than $V_{in}$ and have the same polarity. The efficiency of the converter can be as high as 95% depending on component selection.

$$I_{out}=((V_{in})\times(I_{in})\times(\eta))/V_{out}$$

The addition of resistors 1039 and 1094 as depicted in FIG. 10, allow the switching current thresholds to occur at lower currents through resistor 1024. They effectively lower the current at which transistor 1026 will turn on, by forming a voltage divider from the collector terminal of transistor 1026 to the 0V terminal of the converter. This voltage divider causes the voltage at the base terminal of transistor 1026 to be less than the voltage at the collector of transistor 1040 by an amount equal to the voltage across resistor 1039.

Figure 12:
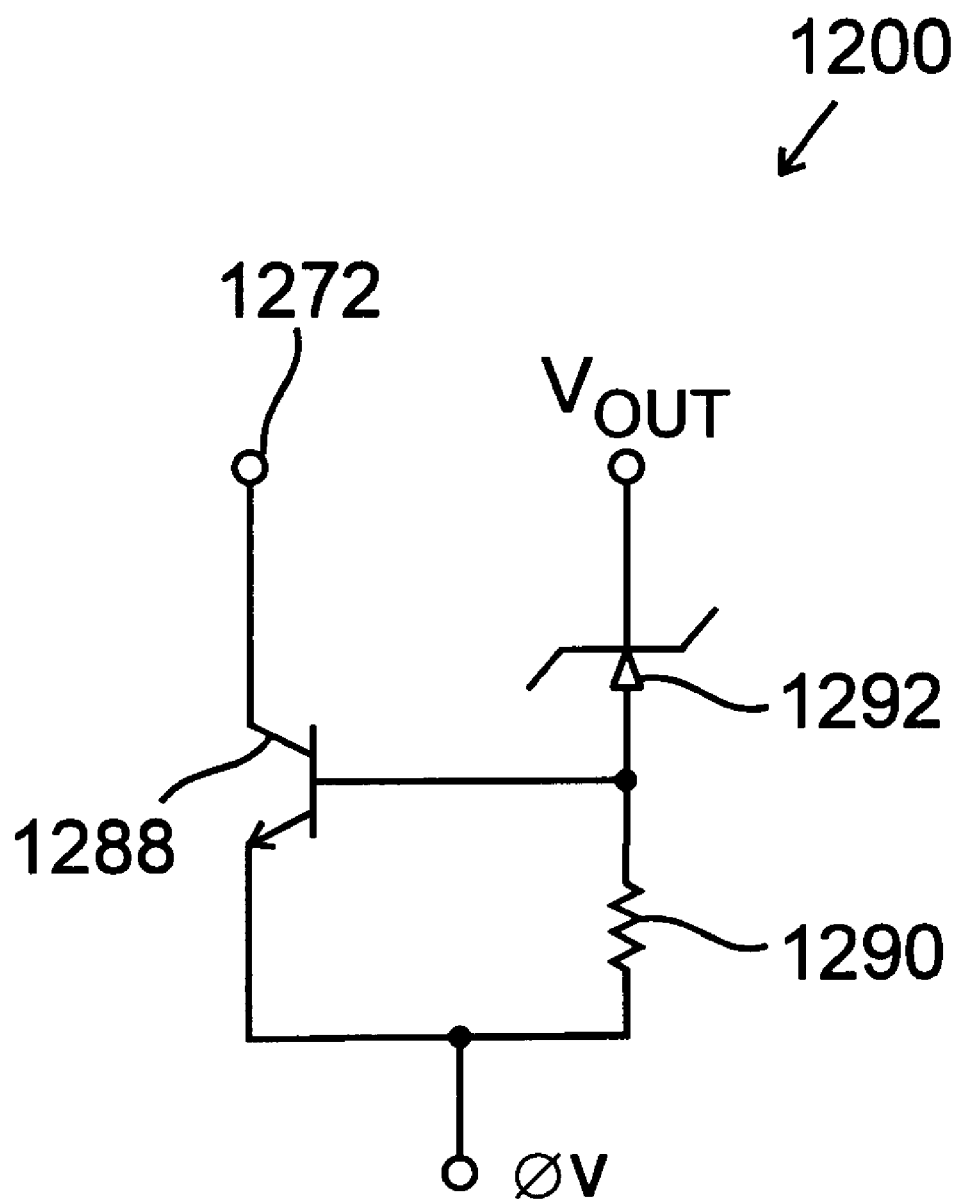
FIG. 12 is a schematic diagram of a variable current source circuit in accordance with the present invention.

Further, the base terminal of transistor 1026 becomes an ideal point to exert variable control over the switching current thresholds. To best implement this performance enhancement, resistor 1038 is replaced with a fixed current source as detailed in FIG. 4, and discussed in further detail in relation to the converter 100 of FIG. 1. Also, a variable current source, as shown in FIG. 12 is substituted for resistor 1094. The circuit of FIG. 12 includes a collector terminal 1272 connected to terminal 1072 of converter 1000. As more current is drawn from terminal 1072 in FIG. 10, and through resistor 1039, the voltage across resistor 1039 will increase, with the base terminal of transistor 1026 being less positive than the collector terminal of transistor 1040. The voltage across resistor 1039 SUBTRACTS from the voltage required across resistor 1024 to cause the switching of transistor 1026. In an implementation of such a converter 1000 which includes negative feedback output voltage regulation, the current sources of FIG. 4 and FIG. 12, are added as previously described. The current drawn by transistor 1288 from terminal 1072 would increase as the current through zener diode 1292 increased with increasing Vout. The increased current drawn from terminal 1072 by transistor 1288 would result in a lowering of the switching current thresholds, causing a decrease in $I_{out}$ and therefore a decrease in $V_{out}$. Thus illustrating negative feedback voltage regulation.

Figure 11:
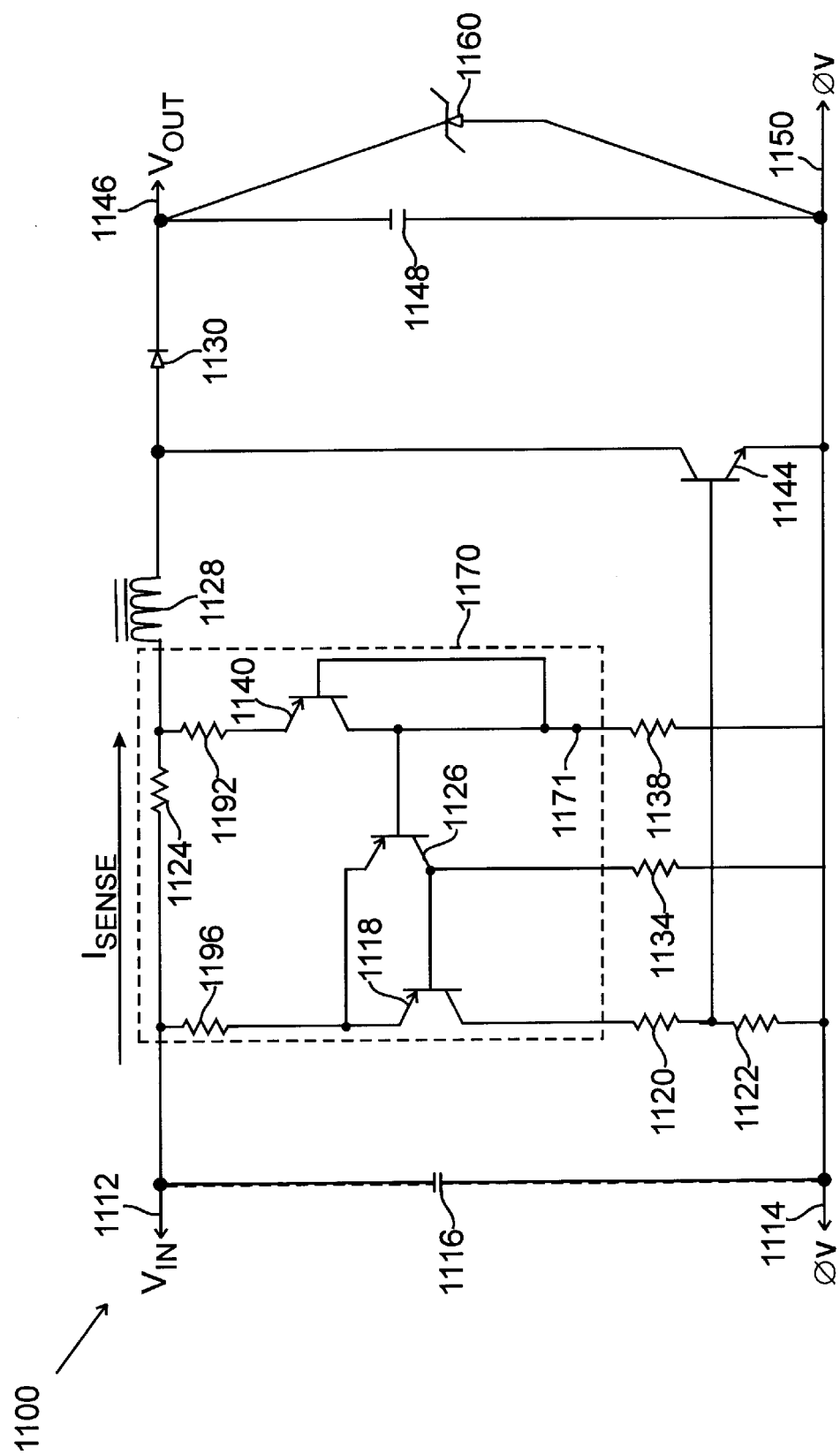
FIG. 11 is a schematic diagram illustrating a DC-to-DC converter current source configured in the BOOST topology in accordance with another aspect of the present invention.

FIG. 11 is a schematic diagram illustrating a DC-to-DC converter 1100 according to another aspect of the present invention. This circuit differs from the circuit of converter 100 in that resistor 142 in converter 100 has been replaced by a short circuit (0 ohms), resistor 136 has been removed, and new resistors 1196, 1192 are added. These resistors were not present in converter 100. The additional resistors 1192 and 1196 modify the operation of the switching comparator circuit, as compared to converter 100 and converter 1000. That is, they add hysteresis around the switching threshold of transistor 1026 in a manner that is different than in the preferred embodiments described in converters 100 and 1000.

Since many components of converter 1100 are arranged in the same manner as the converter 100, like reference numerals are used to designate elements common to the two converters. Converter 1100 is configured in a BOOST topology. That is, the output voltage of converter 1100 is greater than the input voltage to converter 1100. Converter 1100 includes first and second input terminals 1112 and 1114, respectively. A capacitor 1116 is connected between the input terminals 1112 and 1114. In the typical operation of the converter 1100, a voltage source is connected to first input terminal 1112, while a reference or ground voltage is connected to a second input terminal 1114. Terminal 1112 is connected to the junction of a first terminal of a resistor 1124 and a first terminal of a resistor 1196. The second terminal of the resistor 1196 is connected to the junction of the emitter of a first transistor or third switch 1118 and the emitter of a second transistor or second switch 1126. The second terminal of the resistor 1124 is connected to the junction of a first terminal of a resistor 1192 and a first terminal of an inductor 1128. The second terminal of the resistor 1192 is connected to the emitter of a third transistor or first switch 1140. The second terminal of the inductor 1128 is connected to the junction of the collector of a fourth transistor or fourth switch 1144 and the anode of a diode 1130. The cathode of the diode 1130 is connected to a first output terminal 1146 of converter 1100. The first output terminal 1146 is connected to the junction of a first terminal of a capacitor 1148 and a first terminal of a zener diode 1160. The second output terminal 1150 of converter 1100 is connected to a second terminal of the capacitor 1048 and a second terminal of the zener diode 1160.

It will be recognized that although the drawing and textual discussion address separate terminals 1114 and 1150 and separate terminals may be employed, these terminals as drawn are in fact the same electrical node and the DC-to-DC converter can be viewed in its simplest form as a three terminal device with a single input, a single output, and a common connection.

Returning to the transistor 1118, the collector of transistor 1118 is connected to the first terminal of a resistor 1120. The second terminal of the resistor 1120 is connected to a junction between the base of transistor 1144 and the first terminal of resistor 1122. The second terminal of the resistor 1122 is connected to a junction held at ground or 0V as are a second terminal of a resistor 1134, a second terminal of resistor 1138, the emitter of the transistor 1144, the second input terminal 1114 and the second output terminal 1150.

Returning again to transistor 1118, the base of transistor 1118 is connected to a junction between the collector of transistor 1126 and the first terminal of the resistor 1134. The base of transistor 1126 is connected to the junction of the collector of transistor 1140, the base of transistor 1140 and the first terminal of resistor 1138. The components 1118, 1124, 1126, 1140, 1196, and 1192 define a current sensing circuit and switching comparator with hysteresis 1170. Control terminal 1171 sets the current levels at which switching occurs.

The operation of the converter 1100 is generally as follows. Transistor 1140 operates as a diode and provides a $V_{be}$ offset to offset the $V_{be}$ of transistor 1126. Transistor 1126 operates as a saturated switch, and is either fully ON (saturated) or fully OFF.

Transistors 1118 and 1126 and resistor 1196 form a Schmitt-Trigger circuit arrangement. Transistors 1118 and 1144 operate in essentially the same way as transistor 1126, but with phasing opposite to that of transistor 1126. When transistor 1144 is ON, current ramps up or increases in inductor 1128, resistor 1124 and transistor 1144. When transistor 1144 is OFF, current ramps down or decreases in inductor 1128 and resistor 1124, and flows through diode 1130 to the output of converter 1100, at a voltage higher than the input voltage. When transistor 1144 is ON, so is transistor 1118. A current passes through resistor 1196, creating an offset voltage. Assuming all transistor Vbe's to be equal, transistor 1126 will again turn ON when the sum voltage across resistors 1124 plus 1192 equals the voltage across resistor 1196. The voltage across resistor 1196 when transistor 1118 is ON is equal to:

$$Von_{1196}=(Vin-Vbe) \times R_{1196}/(((R_{1120} \times R_{1134})/(R_{1120}+R_{1134}))+R_{1196})$$

When the current through resistor 1024 increases sufficiently so that the sum voltage across resistors 1124 plus 1192 equals $Von_{1196}$ then transistor 1126 will begin to switch ON. When this occurs, transistor 1118 will begin to switch OFF, and the voltage across resistor 1196 will decrease. This results in a relative increase in the voltage at the emitter terminal of transistor 1126, relative to the voltage at its base terminal. Thus transistor 1126 turns on harder, and saturates, causing transistor 1118 to fully switch OFF. This illustrates the positive feedback action and hysteresis afforded by the Schmitt-Trigger arrangement of transistors 1118 and 1126. The new lower voltage across resistor 1196 now establishes the lower current switching threshold. Transistor 1126 will again switch OFF when the current through resistor 1124 has ramped down to the point where the sum voltage across resistors 1124 plus 1140 equals the new voltage established across resistor 1196 ($Voff_{1196}$) as shown in the following equation:

$$Voff_{1196}=Vin \times R_{1196}/(R_{1196}+R_{1134})$$

It has been established that it is the sum voltage across resistor 1124 and resistor 1192, that is compared to the voltage across resistor 1196 to determine when switching will occur in the embodiment of FIG. 11. Therefore controlling the current through resistor 1192, and therefore the voltage across it will vary the currents at which switching occurs. The current through resistor 1192 is dependent on the value of resistor 1138, as well as on the value of Vin. Thus the switching thresholds can be controlled by modifying the value of resistor 1138. Alternately, a constant current source can be substituted for resistor 1138 to draw a constant current from control node 1171, and through resistor 1192. This current source is shown in FIG. 4, and discussed in further detail in relation to the converter 100 of FIG. 1. Alternately, a variable current source circuit 1200 as shown in FIG. 12, can be substituted for resistor 1138, to implement negative feedback voltage regulation. Circuit 1200 includes a transistor 1288. The collector of transistor 1288 is connected to a node 1272. The emitter of transistor 1288 is connected to a junction, usually held at ground, as is the second terminal of a resistor 1290. The base of transistor 1288 is connected to a junction of the anode of a zener diode 1292 and a first terminal of the resistor 1290. The cathode of the zener diode 1292 is connected to Vout.

In such an implementation, the node 1272 would then be connected to control terminal 1171 of FIG. 11. As the current drawn by this current source from control terminal 1171 increases, the voltage required across resistor 1024 to cause switching of transistor 1026 will decrease. Negative feedback regulation is thus accomplished as zener diode 1292 conducts more current into the base terminal of transistor 1288 as Vout increases. This causes transistor 1288 to draw more current from control node 1171, thus lowering the switching current thresholds, the average (DC) value of $I_{out}$, and ultimately Vout, completing the negative feedback voltage regulation loop.

A disadvantage of the embodiment of FIG. 11, is that the voltage thresholds established across resistor 1196 are dependent on Vin. This is evident from inspection of the previous equations for $Von_{1196}$ and $Voff_{1196}$. In contrast, the preferred embodiments of converters 100 and 1000, use resistor 136 and 1036 respectively, to add hysteresis and positive feedback to the comparator circuit, and provide switching current thresholds which are not dependent on the value of Vin.

Other applications will be apparent to those of ordinary skill in the art in light of the present teachings and claims.

I claim:

1. A self-oscillating switched mode, DC-to-DC converter for receiving an input voltage and producing an output voltage, comprising:

a first switch connected between a first input terminal and a first output terminal through a current sensing element, the first input terminal being connected to an input voltage, the first output terminal producing an output voltage, the first switch being either in an OFF or an ON state and when in its ON state conducting an essentially constant current;

a second switch connected between the first input terminal and the first output terminal, the second switch alternating between a fully ON and a fully OFF state, the second switch having a turn-on threshold depending on a voltage drop between the first switch and the second switch, the state of the second switch depending on the voltage drop between the first switch and the second switch with respect to the turn-on threshold, the second switch operating opposite in phase to the first switch;

a third switch connected between the first input terminal and the first output terminal, the third switch operating opposite in phase to the second switch, having a state controlled by the second switch;

a fourth switch connected between the first input terminal and the first output terminal, the fourth switch operating in phase with the third switch, having a state controlled by the third switch;

a second input terminal connected to a second output terminal, the second input terminal and the second output terminal being further connected to a reference voltage;

current storage and sensing means receiving current from the fourth switch and producing a voltage drop between the first switch and the second switch, the voltage drop depending on the level of stored current, the voltage drop serving to control the state of the second switch; and hysteresis means for controlling the turn-on threshold of the second switch.

2. The converter of claim 1 wherein each of the switches is a transistor.

3. The converter of claim 2 wherein the ON state of the second through fourth switches is a fully saturated state.

4. The converter of claim 3 wherein the current storage and sensing means is connected between the fourth transistor and the first transistor, the current storage and sensing means comprising an inductor and a resistor further connected to the first output terminal, the current storage and sensing means being operative to pass current to the first output terminal to produce an output voltage, a diode being further connected between the current storage and sensing means and the second input and output terminals.

5. The converter of claim 4, further comprising a constant current source connected between the first input terminal, the base of the first transistor, the first output terminal, and a reference voltage, the constant current source including a Zener diode having an anode connected to a reference voltage and a cathode connected to the first output terminal, the constant current source being operative to maintain the voltage output of the converter at a constant level.

6. The converter of claim 4, further comprising a shunt voltage regulator connected between the first and second output terminals to maintain the output voltage at a substantially constant level.

7. The converter of claim 1 wherein the fourth switch is connected between the first input terminal and the first output terminal through current storage and sensing means.

8. A self-oscillating switched mode, DC-to-DC converter for receiving an input voltage and producing an output voltage, comprising:

- a first switch connected between a first input terminal and a first output terminal, the first input terminal being connected to an input voltage, the first output terminal being connected to a reference voltage, the first switch being in either an OFF or an ON state and when in its ON state conducting an essentially constant current;
- a second switch connected between the first input terminal and the first output terminal, the second switch alternating between a fully ON and a fully OFF state, the second switch having a turn-on threshold depending on a voltage drop between the first switch and the second switch, the state of the second switch depending on the voltage drop between the first switch and the second switch with respect to the turn-on threshold, the second switch operating opposite in phase to the first switch;
- a third switch connected between the first input terminal and the first output terminal, the third switch operating opposite in phase to the second switch, having a state controlled by the second switch;
- a fourth switch connected between the first input terminal and the first output terminal through a current storage and sensing means, the fourth switch operating in phase with the third switch, having a state controlled by the third switch;
- a second input terminal connected to the first output terminal, the second input terminal and the first output terminal being further connected to said reference voltage;
- a second output terminal separated from the fourth switch by a diode, the second output terminal producing an output voltage in response to current flowing from the current sensing and storage means to the second output terminal through the diode;
- the current storage and sensing means receiving current from the fourth switch and producing a voltage drop between the first switch and the second switch, the voltage drop depending on the level of stored current, the voltage drop serving to control the state of the second switch; and
- hysteresis means for controlling the turn-on threshold of the second transistor switch.

9. The converter of claim 8 wherein each of the switches is a transistor.

10. The converter of claim 9 wherein the ON state of the second through fourth switches is a fully saturated state.

11. The converter of claim 10 wherein the current storage means is connected between the fourth transistor and the first transistor, the current storage means being further connected through the current sensing means, which comprises a resistor, to the first output terminal, the current storage means being operative to pass current to the first output terminal, a diode being further connected between the current storage means and the second output terminal.

12. The converter of claim 11 further comprising a constant current source connected between the first input terminal, the base of the first transistor, the second output terminal, and a reference voltage, the constant current source including a Zener diode having an anode connected to the second output terminal and a cathode connected through to the first output terminal, the constant current source being operative to maintain the voltage output of the converter at a constant level.

13. The converter of claim 11, further comprising a shunt voltage regulator connected between the first and second output terminals to maintain the output voltage at a substantially constant level.

14. The converter of claim 8 wherein the first switch is connected between the first input terminal and the first output terminal through a current sensing element.

* * * * *